US012285367B2

(12) United States Patent
Patzer

(10) Patent No.: US 12,285,367 B2
(45) Date of Patent: Apr. 29, 2025

(54) CONFIGURABLE ASSEMBLY FOR PROVIDING MEDICAL CARE TO A PATIENT

(71) Applicant: Drägerwerk AG & Co. KGaA, Lübeck (DE)

(72) Inventor: Marco Patzer, Lübeck (DE)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 5 days.

(21) Appl. No.: 17/926,209

(22) PCT Filed: Dec. 7, 2021

(86) PCT No.: PCT/DE2021/100975

§ 371 (c)(1),
(2) Date: Nov. 18, 2022

(87) PCT Pub. No.: WO2022/127983

PCT Pub. Date: Jun. 23, 2022

(65) Prior Publication Data

US 2023/0301861 A1 Sep. 28, 2023

(30) Foreign Application Priority Data

Dec. 16, 2020 (DE) ..................... 10 2020 133 645.4

(51) Int. Cl.
*A61G 12/00* (2006.01)
*E04F 13/072* (2006.01)
*E04F 13/08* (2006.01)

(52) U.S. Cl.
CPC .......... *A61G 12/005* (2013.01); *E04F 13/072* (2013.01); *E04F 13/081* (2013.01); *E04F 13/0869* (2013.01)

(58) Field of Classification Search
CPC .... A61G 12/005; E04F 13/072; E04F 13/081; E04F 13/0869
See application file for complete search history.

(56) References Cited

U.S. PATENT DOCUMENTS 4,338,485 A 7/1982 Fullenkamp et al.
4,753,055 A 6/1988 Durham, Jr.
(Continued)

FOREIGN PATENT DOCUMENTS

DE 296611 A5 12/1991
DE 202004016882 U1 1/2005
(Continued)

*Primary Examiner* — Rodney Mintz
(74) *Attorney, Agent, or Firm* — McGlew and Tuttle, P.C.

(57) ABSTRACT

An arrangement for the medical care of a patient. The arrangement includes a total set of supply ports (22.1, 30.1), a frame (20), at least one detachably mountable wall panel (11.1, 11.4) and a respective wall panel fastening unit for each detachably mountable wall panel (11.1, 11.4). Each detachably mountable wall panel (11.1, 11.4) can be detachably fastened to the frame (20). The total set of supply ports (22.1, 30.1) provides the supply media, which all the medical devices need for intensive care. With the detachably mountable wall panels (11.1, 11.4) fastened to the frame (20), a remaining set of supply ports (22.1) remains free. This remaining set is capable of supplying the medical devices that are needed for normal care.

20 Claims, 13 Drawing Sheets

(56) References Cited

U.S. PATENT DOCUMENTS

| | | | | |
|---|---|---|---|---|
| 4,821,470 | A | 4/1989 | Kappers et al. | |
| 5,653,064 | A | 8/1997 | Kappers et al. | |
| 5,653,065 | A | 8/1997 | McIlwain | |
| 7,040,057 | B2 * | 5/2006 | Gallant | A61G 7/0514 52/36.2 |
| 7,204,714 | B2 * | 4/2007 | Walker | E04H 3/08 439/532 |
| 7,254,850 | B2 * | 8/2007 | Newkirk | A61G 13/107 137/355.16 |
| 7,775,000 | B2 * | 8/2010 | Walker | E04F 17/08 52/220.1 |
| 7,878,809 | B2 * | 2/2011 | Miller | G09B 23/28 52/29 |
| 8,441,782 | B2 * | 5/2013 | Thomas | E05C 19/166 361/679.02 |
| 8,678,334 | B2 * | 3/2014 | Chance | H01R 35/00 5/503.1 |
| 8,683,750 | B2 * | 4/2014 | Gallant | E04B 2/745 52/36.2 |
| 9,084,489 | B2 * | 7/2015 | Gosling | A47C 17/38 |
| 9,237,979 | B2 * | 1/2016 | Carnell | A61G 12/005 |
| 9,719,251 | B2 * | 8/2017 | Gosling | E04B 1/34326 |
| 2003/0014817 | A1 | 1/2003 | Gallant et al. | |
| 2003/0177713 | A1 | 9/2003 | Walker et al. | |
| 2004/0231248 | A1 | 11/2004 | Walker et al. | |
| 2006/0207025 | A1 | 9/2006 | Newkirk et al. | |
| 2007/0259321 | A1 | 11/2007 | Miller et al. | |
| 2010/0212087 | A1 | 8/2010 | Leib et al. | |
| 2011/0209835 | A1 | 9/2011 | Balbona et al. | |
| 2012/0042581 | A1 | 2/2012 | Chance | |
| 2012/0218701 | A1 | 8/2012 | Thomas | |
| 2012/0258655 | A1 * | 10/2012 | Carnell | E04H 3/08 454/284 |
| 2013/0145700 | A1 | 6/2013 | Gallant | |
| 2014/0310873 | A1 | 10/2014 | Gosling et al. | |
| 2015/0143763 | A1 | 5/2015 | Gosling | |

FOREIGN PATENT DOCUMENTS

| | | | |
|---|---|---|---|
| DE | 102007024307 | A1 | 12/2008 |
| DE | 102013114622 | A1 | 4/2015 |

* cited by examiner

CONFIGURABLE ASSEMBLY FOR PROVIDING MEDICAL CARE TO A PATIENT

CROSS REFERENCE TO RELATED APPLICATIONS

This application is a United States National Phase Application of International Application PCT/DE2021/100975, filed Dec. 7, 2021, and claims the benefit of priority under 35 U.S.C. § 119 of German Application 10 2020 133 645.4, filed Dec. 16, 2020, the entire contents of which are incorporated herein by reference.

TECHNICAL FIELD

The present invention pertains to a configurable arrangement, which provides at least two supply ports for medical devices for the care of a patient.

BACKGROUND

The German Hospital Future Act stipulates that a hospital must provide a defined number of care places for intensive care.

SUMMARY

A basic object of the present invention is to provide an arrangement for the medical care of a patient, wherein this arrangement shall make possible the intensive care of a patient and wherein predefined requirements can be better met than in case of prior-art care arrangements.

The present invention is accomplished by an arrangement having features according to the invention. Advantageous embodiments are described in this disclosure.

The arrangement according to the present invention is configured to make possible the medical care of a patient.

The arrangement comprises a total set of supply ports. This total set comprises at least two supply ports. Each supply port is capable of providing at least one respective supply medium for a medical device for the care of the patient. Examples of such a supply medium are breathing air, pure nitrogen (N2), nitrous oxide (N2O), an anesthetic (anesthetic), compressed air, a cleaning fluid, another fluid (gas or liquid), a drain line for fluid, electric energy (e.g., standard AC voltage, 220 V AC in Germany, or three-phase AC/power current, 360 V AC in Germany) and a data connection for the connection of a medical device to a stationary data network, for example, an Ethernet outlet (i.e., data and messages are a supply medium).

The total set of supply ports of the arrangement are all configured to provide the necessary supply ports for an intensive care of the patient, i.e., the medical devices that are used or can be used for intensive care with the respective, necessary supply media. Of course, it depends on the patient which medical devices and thus which supply ports are actually needed for intensive care.

The arrangement according to the present invention further comprises

- a frame,
- at least one detachably mountable wall panel and
- a respective wall panel fastening unit for each detachably mountable wall panel.

The respective wall panel fastening unit is capable of detachably holding the wall panel at the frame. Hence, the wall panel can be fastened to the frame by means of the wall panel fastening unit. The fastened wall panel can again be detached from the frame. In case of two wall panels, the arrangement comprises two wall panel fastening units.

Each wall panel is in one of two possible states in regard to the frame:

- The wall panel is fastened to the frame by means of the wall panel fastening unit such that the wall panel cannot be moved in relation to the frame.
- The wall panel is detached from the frame such that no mechanical connection occurs between the frame and the wall panel and the wall panel can be moved freely in relation to the frame.

The arrangement according to the present invention is configured as follows: When the detachably mountable wall panel or at least one detachably mountable wall panel is actually fastened to the frame, then at least one supply port of the total set, preferably a plurality of supply ports of the total set, is/are hidden by the wall panel or by a wall panel at the frame. A remaining set of supply ports of the total set remains, by contrast, free, i.e., not hidden by the wall panel or by a wall panel, and may provide a supply medium for a medical device. This remaining set comprises at least one supply port of the total set, preferably a plurality of supply ports of the total set.

The remaining set of the supply ports of the arrangement are all configured to provide the support ports for a normal care of the patient, i.e., the supply ports, which are needed to supply the medical devices which are used or can be used for a normal care with the respective, necessary supply media. Of course, it depends on the patient, which medical devices and thus which supply ports are actually needed for a normal care.

The arrangement according to the present invention can be selectively used for the intensive care or for the normal care of a patient. The detachably mountable wall panel or at least one detachably mountable wall panel, especially each detachably mountable wall panel, is actually mounted at the frame during normal care. At least one detachably mountable wall panel is not fastened to the frame during intensive care, preferably no detachably mountable wall panels are mounted at the frame, so that all supply ports needed for the intensive care are exposed.

All supply ports of the total set are available for intensive care. This total set is configured such that each medical device that is needed or can be used for intensive care can be connected to at least one respective supply port of the total set.

The supply ports of the remaining set are available for normal care. This remaining set is configured such that each medical device that is needed or can be used for normal care can be connected to at least one supply port of the remaining set.

The set of the supply ports, which belong to the total set, but not to the remaining set, is designated below as the "intensive care set." When the detachably mountable wall panel or each detachably mountable wall panel is actually fastened to the frame, the supply ports of the intensive care set are hidden.

Because the arrangement according to the present invention can be used for intensive care, the arrangement according to the present invention is capable of contributing to providing an intensive care place. In case, however, the arrangement is not currently needed for an intensive care, it can, instead, be used for normal care. The present invention thus spares the need to have to keep ready a care place for intensive care, but not to be able to use this care place for a normal care, when the care place is currently not needed for intensive care. As a result, the present invention contributes to reducing the number of intensive care places, which stand by unused. Thanks to the present invention, sufficient numbers of intensive care places are available as needed in many cases since a care place with the arrangement according to the present invention can be rapidly converted into an intensive care place.

When the arrangement is used for a normal care, the detachably mountable wall panels of the arrangement hide the supply ports, which belong to the intensive care set, i.e., to the total set, but not to the remaining set. The supply ports or at least some of the supply ports of the intensive care set can thus be hidden by the mounted wall panels during normal care.

This feature of the present invention makes it easier to clean and disinfect the arrangement during the normal care and thus to meet hygienic requirements for a medical care place. As long as the wall panel or each wall panel is fastened to the frame, it is sufficient to clean the surface pointing towards a hospital bed, i.e., the outer surface, of the wall panel or of each wall panel. The supply ports, which are not needed for normal care, are hidden by the wall panel or by a wall panel and are hence exposed to impurities and other harmful substances to a lesser extent.

The risk that a supply port of the intensive care set is mechanically damaged is reduced thanks to the mounted wall panels. As long as the arrangement is needed for a normal care, these supply ports rarely need to be cleaned and disinfected or not at all. It is possible to configure the outer surface of a wall panel as smooth, so that no impurities and harmful substances can collect on the surface. The outer surface of a wall panel can be further configured such that the wall panel is resistant to the cleaning agents and disinfectants used.

Moreover, when the detachably mountable wall panel or each detachably mountable wall panel is mounted at the frame, the supply ports of the intensive care set are accessible and visible from outside. Because the supply ports of the intensive care set are then not accessible, the risk that a medical device used for normal care is erroneously connected to a supply port of the intensive care set is reduced. This could lead to a health risk to the patient or to a damage of the connected medical device. Furthermore, the risk that a supply port, which is used only for an intensive care, is contaminated or damaged during normal care is reduced. A wall panel mounted at the frame protects this supply port. Because the supply ports of the intensive care set are not visible from outside in case of mounted wall panels, but only the supply ports that are needed for a normal care, patients as well as nursing staff members are, moreover, less psychologically ("mentally") stressed than if all supply ports of the total set were visible during normal care.

According to the present invention, the detachably mountable panel or each detachably mountable wall panel can be connected to the frame of the arrangement and removed from the frame again. As a result, the detachably mountable wall panels can be rapidly removed from the frame, so that the supply ports that belong to the intensive care set are accessible and usable. Especially because of this property, the arrangement can be rapidly changed from a use for normal care to a use for intensive care. Conversely, in order to convert the arrangement according to the present invention from a configuration for intensive care to a configuration for normal care, it is sufficient to fasten the detachably mountable wall panel or at least one detachably mountable wall panel to the frame. Conversely, in order to configure the arrangement for intensive care, it is sufficient to remove this wall panel from the frame again, as a result of which the supply ports of the intensive care set are also accessible. The need for an intensive care place frequently arises suddenly and is not predictable, so that it is advantageous when this intensive care place can be provided rapidly.

When a detachably mountable wall panel is fastened to the frame, then a movement of the wall panel in relation to the frame is prevented. This embodiment increases the safety of the arrangement, because an unwanted or unintentional or accidental movement of the wall panel may lead to an injury of a person or to a damage of a device.

When a detachably mountable wall panel is detached from the frame, then this wall panel can be moved freely in relation to the frame and can also be removed. As a result, space is saved compared with an embodiment, in which at least one pivotable or displaceable door is fastened to the frame and selectively releases or hides at least one supply port. Even if it releases the supply port, the door needs space at the frame or in the frame, regardless of whether it is fastened in a pivotable or displaceable manner. In many cases, a door must be fastened both in the closed position and in the open position in order to prevent an undesired movement of the door. This frequently requires a plurality of fastening points. A wall panel according to the present invention can, by contrast, be detached from the frame and then be removed completely and takes away no more space at the frame after the removal. It is possible to clean and disinfect a wall panel, which is currently not fastened to a frame, from all sides.

The present invention makes it possible to get along with fewer detachably mountable wall panels. Thanks to the present invention, the same wall panel can be selectively mounted at a first position or at a second position different from the first position, even at different frames. In addition, the present invention makes it easier in many cases to replace a damaged wall panel rapidly. The replacement of a door frequently requires more time.

Thanks to the wall panels, no additional steps are necessary to change the configuration in many cases. In particular, it is not necessary to add a supply port. It is possible in many cases to convert an available arrangement for an intensive care such that an arrangement according to the present invention arises. It is frequently sufficient to add the detachably mountable wall panel or each detachably mountable wall panel and the respective wall panel fastening unit.

The present invention spares the need to fasten supply ports to a supply port carrier, which is rotatable or pivotable in a different manner, wherein a first surface or a second surface of this carrier selectively points towards the medical devices used. In order to pivot such a supply port carrier, free space is necessary in a hospital room. Free space is, however, frequently scarce. In addition, all supply ports are then in many cases also accessible from outside during normal care, as a result of which they become contaminated or can be contaminated with pathogens or a supply port could be erroneously connected to a medical device. By contrast, thanks to the wall panels according to the present invention, a smooth and preferably continuous surface can be provided both for normal care and for intensive care, which have only the respective supply ports needed as unevennesses. Compared with a pivotable supply port carrier, the present invention hence makes it easier to clean and disinfect the arrangement. Moreover, a pivotable supply port carrier requires hinges and optionally additional swivel arms, which are in many cases subject to a more extensive wear than a wall panel fastening unit according to the present invention.

The present invention makes possible in many cases an intuitive approach to adapt a medical workplace to a normal care or an intensive care. In order to adapt the workplace for an intensive care, it is sufficient to detach and remove all detachably mountable wall panels from the frame. Conversely, to adapt the workplace for a normal care, it is sufficient to fasten all detachably mountable wall panels to the frame. In many cases, the risk that a supply port needed for an intensive care is erroneously hidden by a wall panel or conversely a supply port not needed for normal care is freely accessible, because is it not hidden by a wall panel, is reduced. In many cases, separate instructions as to which supply ports have to be accessible for intensive care and which can be hidden during normal care are eliminated.

"Wall panel" is defined in this text as a portable and movable object, which comprises at least one component, which extends in a plane. The greatest dimension of the component at right angles to this plane is at most one-tenth of the greatest dimension in this panel. A wall panel may also comprise at least two components, which extend in a respective plane, wherein an angle, for example, a right angle, occurs between these two planes. The at least two components are preferably connected rigidly to one another. The wall panel may be made of wood or plastic or metal. At least the surface, which points towards a hospital room in case of the mounted wall panel, preferably each surface of the wall panel, is sufficiently resistant to cleaning agents and disinfectants and is preferably smooth.

It is possible that the wall panel comprises a two-dimensional component, this two-dimensional component extending preferably parallel to a wall when the wall panel is mounted at the frame and the frame is located at this wall. Two additional components are mounted at two opposite edges of this two-dimensional component, optionally a third component is mounted at a third edge. As a result, the wall panel has the form of a box and encloses a space in front of the wall. At least one supply port of the total set, which does not belong to the remaining set, is preferably located in this space. The box protects the supply port or each supply port against contamination and harmful particles.

In one embodiment, the arrangement comprises at least one additional wall panel that is mounted permanently at the frame, in addition to the detachably fastenable wall panels. "Permanently mounted" means: When the arrangement is converted from normal care to intensive care or vice versa, the additional wall panel remains at the wall. The detachably mountable wall panel or each detachably mountable wall panel and the additional wall panel or each additional wall panel form at least one continuous surface, when each detachably mountable wall panel is actually mounted at the frame. This continuous surface may be interrupted, for example, by supply ports or a supply port carrier.

The frame of the arrangement preferably provides at least one chamber, i.e., a cavity, which is enclosed by a plurality of walls of the frame. The detachably mountable wall panel or at least one detachably mountable wall panel, and preferably a plurality of wall panels, can be stored in this chamber when these wall panels are not needed. In particular, this chamber accommodates the detachably mountable wall panel or at least one detachably mountable wall panel during intensive care, which wall panel hides a supply port, which belongs to the intensive care set, during normal care.

This embodiment further reduces the time that is necessary for the conversion of the arrangement from normal care to intensive care or vice versa. Because at least one detachably mountable wall panel can be stored in the chamber, it is not necessary to store this wall panel outside of the frame or to get it from a location outside of the frame. As a result, it is sufficient to transport the wall panel only from the chamber in the interior of the frame to a mounting place at the frame in order to convert the care arrangement from intensive care into normal care. The risk that a needed wall panel is missing and hence a supply port of the intensive care set is visible and accessible even during normal care and can become contaminated and has to be cleaned and therefore be disinfected is reduced. In order to convert the arrangement from normal care into intensive care, it is sufficient to insert the wall panel into the chamber.

The arrangement comprises a first wall panel and at least one second wall panel in a variant of this embodiment. Both the first wall panel and the second wall panel or each second wall panel are each a detachably mountable wall panel. The chamber is capable of accommodating the second wall panel or at least one, preferably each second wall panel. When it is fastened to the frame, the first wall panel hides the chamber with the second wall panel. The first wall panel fastened to the frame hence reduces the risk that the chamber and an object located in the chamber are damaged or contaminated and have to be repaired or cleaned or disinfected. In one embodiment, the second wall panel or a second wall panel, when it is mounted at the frame, hides at least one supply port, which belongs to the intensive care set, i.e., to the total set, but not to the remaining set.

In another variant of this embodiment, the frame further comprises a supply port carrier with at least one supply port, which belongs to the intensive care set. At least one space in the interior of the frame adjoins this supply port carrier. A second wall panel, when it is fastened to the frame, hides this adjoining space. The supply port carrier and the supply ports in this supply port carrier also remain accessible in case of a mounted second wall panel. This adjoining space may belong to the just described chamber, which can be covered by the first wall panel.

These two variants of the embodiment can be combined.

In one embodiment, the arrangement comprises a holding device, which is capable of holding a medical device, which is needed for intensive care and can be used for this and is preferably not needed for a normal care. A holding device fastening unit of the arrangement is fastened to the frame. The holding device can be detachably fastened to the frame by means of the holding device fastening unit. For example, the holding device fastening unit comprises an external thread and the holding device comprises an internal thread or vice versa. It is also possible that the holding device can be fastened to the frame by means of a snap connection or snap-in connection or at least one hook.

According to a variant of this embodiment, the arrangement further comprises a normal care wall panel and an intensive care wall panel, wherein at least one opening is provided in the intensive care wall panel and preferably no opening is provided in the normal care wall panel. These two wall panels are detachably mountable wall panels. When the normal care wall panel is mounted at the frame, then it hides the holding device fastening unit and as a result avoids a contamination or bacterial contamination of the holding device fastening unit. When the intensive care wall panel is mounted at the frame, then at least one component of the holding device can be passed through the opening or a respective opening of the mounted intensive care wall panel. The holding device can then be detachably fastened to the holding device fastening unit and thus be detachably fastened to the frame. The opening in the mounted intensive care wall panel preferably guides the component of the holding device during the insertion and ensures that this component has the correct position in relation to the frame. This embodiment makes it easier to mount the holding device when the intensive care wall panel is already mounted at the frame. A chamber, which is provided by the frame, can be hidden and thereby protected selectively by the normal care wall panel mounted at the frame or by the intensive care wall panel mounted at the frame.

A chamber of the frame preferably accommodates the unmounted holding device after the holding device has been broken down into at least two components. Thanks to this embodiment with the chamber, a damage or a contamination of the holding device in the chamber is prevented. Because the holding device is stored in a chamber in the frame and not at a location at a distance in space, the risk that the holding device is missing when it is needed for intensive care is reduced. The normal care panel preferably hides this chamber, when the normal care wall panel is mounted at the frame.

In one embodiment, at least one wall panel, preferably each wall panel when it is mounted at the frame, has a smooth surface, which points away from the frame and towards a medical device connected to a supply port and thus also towards a hospital bed in front of the arrangement. This smooth surface can be cleaned and disinfected especially easily. The detachably mountable and actually mounted wall panels preferably form a continuous surface, optionally together with the permanently mounted wall panels, wherein this continuous surface is interrupted by at least one supply port carrier and optionally by a supply port in a wall panel.

In another embodiment, a supply port is provided in at least one wall panel. This supply port is connected to a coupling unit. The coupling unit can be connected to a counter coupling unit in a wall. This embodiment saves space compared to an embodiment, in which no wall panel provides a supply port.

In a preferred embodiment, the detachably mountable wall panel or at least one detachably mountable wall panel of the arrangement can be detachably fastened to the frame by means of at least one respective suction connection or snap-in connection. When the wall panel is moved towards the frame, an element of the suction connection or snap-in connection located at the wall panel points towards the frame. This embodiment spares the need to have to use a tool to fasten the wall panel to the frame and to detach it from the frame again. In particular, it is not necessary to have to use a screwdriver or another tool. In many cases, when the mounting or removal of a wall panel requires a tool, an opening in the wall panel has to be present. Dirt particles and germs may reach the interior of the frame. The embodiment with the suction connection or snap-in connection makes it possible to provide a detachably mountable wall panel with a smooth outer surface and ideally without an opening. This embodiment makes cleaning and disinfection easier.

In a preferred embodiment, the arrangement comprises at least one manipulating unit, especially at least one suction gripper, which can be detachably connected to the detachably mountable or mounted wall panel or to a detachably mountable or mounted wall panel, and especially can be placed onto a surface of the wall panel. When the manipulating unit is connected to a wall panel, the wall panel can be carried and can especially be brought to a desired position at the frame. The embodiment spares the need to provide a grip at a wall panel or an opening in a wall panel in order to carry the wall panel by means of the grip or the opening. Rather, the wall panel may have a smooth surface without opening and without grip, onto which the manipulating unit can be placed.

The present invention will be described below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
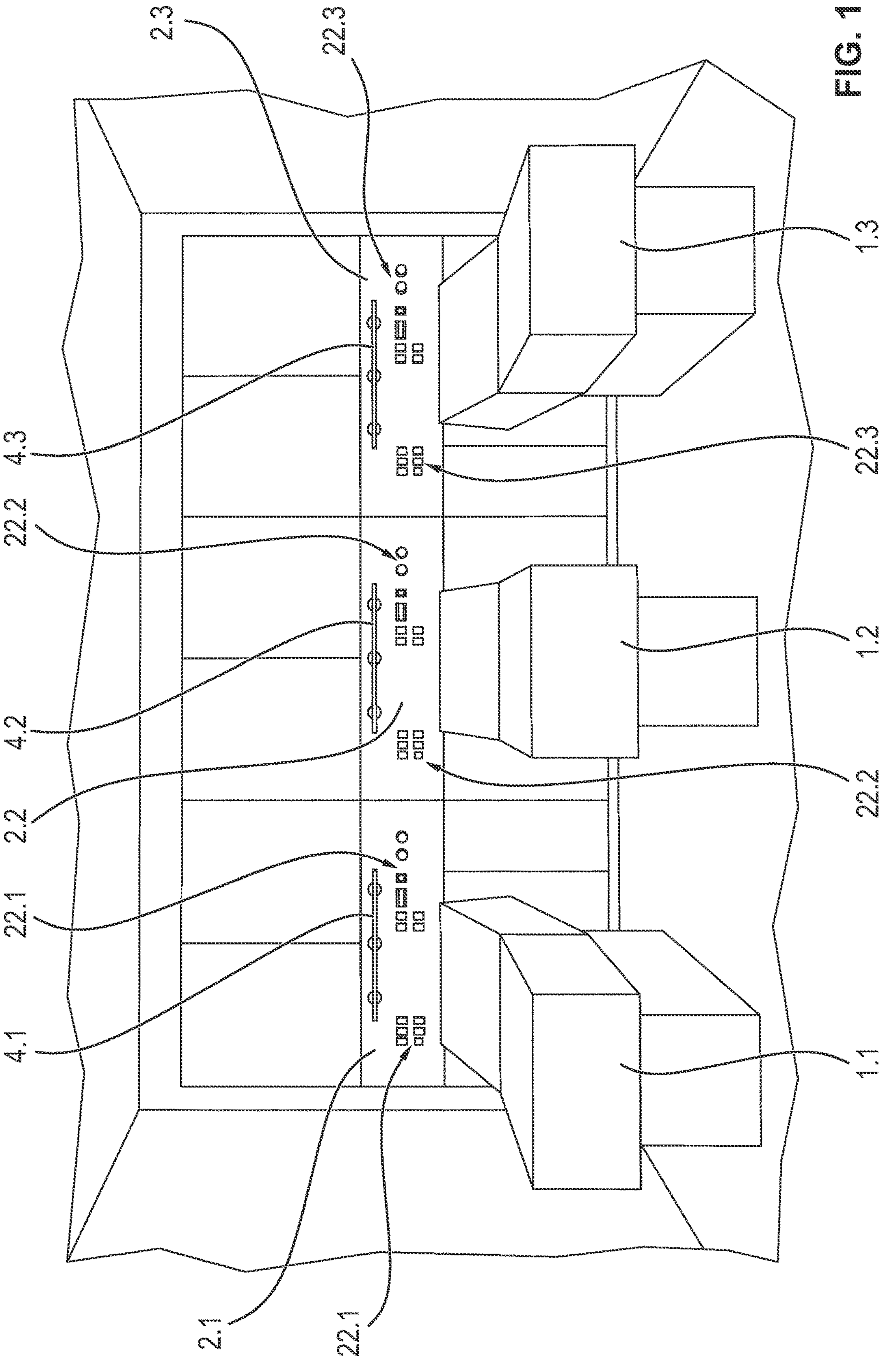
FIG. 1 is a perspective view showing a hospital room configured for normal care.
Figure 2:
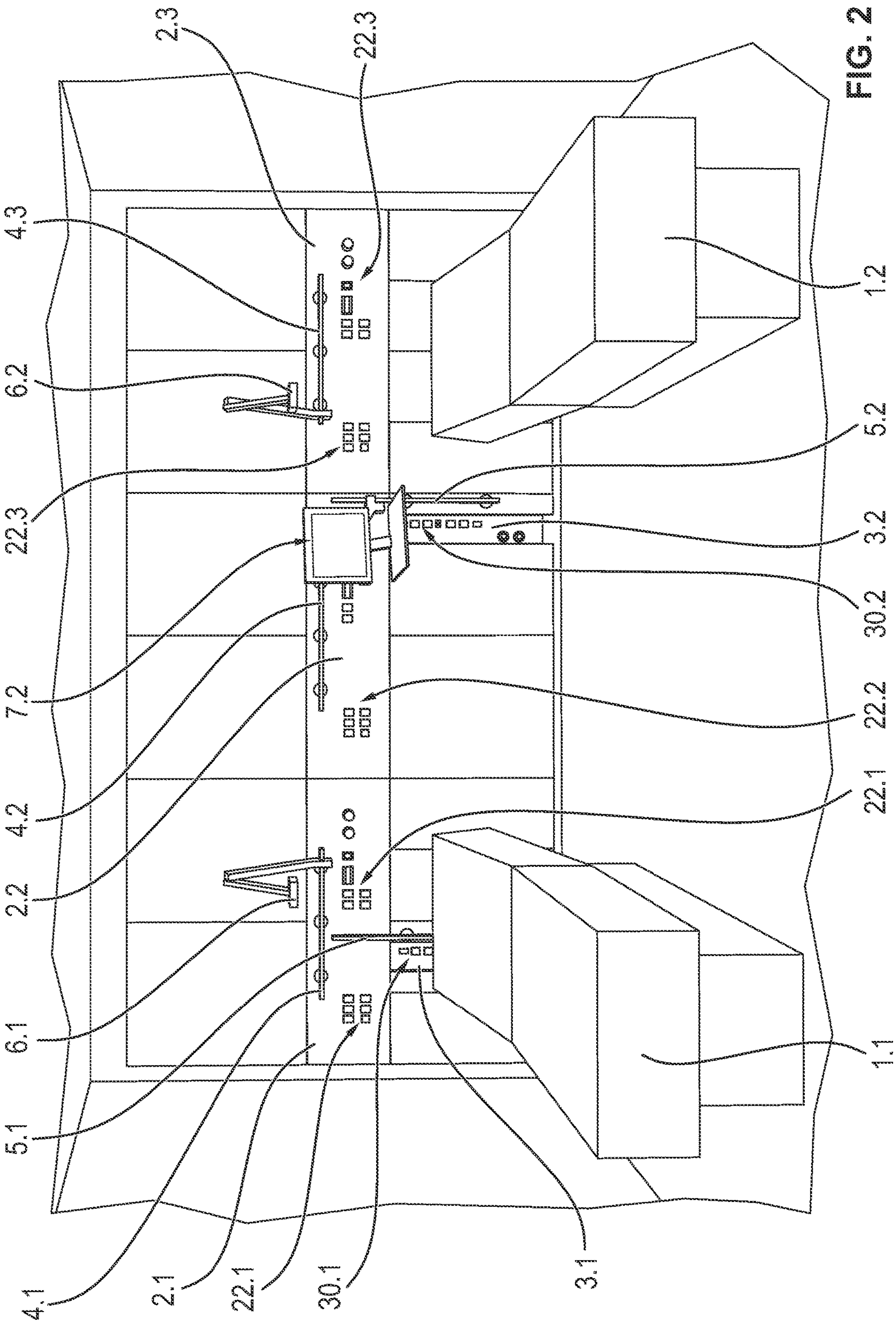
FIG. 2 is a perspective view showing the hospital room from FIG. 1 configured for intensive care.

Referring to the drawings, FIG. 1 and FIG. 2 show an exemplary hospital room that is configured for normal care (FIG. 1) or for intensive care (FIG. 2). In the configuration for normal care, three hospital beds 1.1, 1.2, 1.3 are placed into the hospital room, and only two hospital beds 1.1, 1.2 in the configuration for intensive care. In one embodiment, there is a distance of at least 1.20 m between two adjacent hospital beds in case of normal care, and a distance of at least 2.25 m in case of intensive care. As a result, there is more space between two hospital beds for nursing staff members and for medical devices in case of intensive care than in case of normal care.

Three supply port carriers 2.1, 2.2, 2.3 are permanently mounted to a wall of the hospital room. Each supply port carrier 2.1, 2.2, 2.3 contains a respective set of supply ports 22.1, 22.2, 22.3, wherein each supply port provides a respective supply medium. Examples of supply media are electric current, breathing air, pure oxygen (O2), nitrous oxide (N2O), anesthetic, compressed air, a cleaning fluid as well as a connection to a stationary data network (a "data outlet," e.g., an Ethernet outlet).

A respective horizontal track 4.1, 4.2, 4.3, to which, for example, an illuminating unit 6.1, 6.2, 6.3 can be fastened (FIG. 2), is arranged at each supply port carrier 2.1, 2.2, 2.3 above the supply ports 22.1, 22.2, 22.3. Different wall panels, which will be described below, are arranged above and below the supply port carriers 2.1, 2.2, 2.3.

The supply ports 22.1, 22.2, 22.3 are used both for normal care and for intensive care or they can be used for both. Two supply port carriers 3.1, 3.2 with additional supply ports 30.1, 30.2 are additionally visible and available in the configuration for intensive care, cf. FIG. 2. In case of normal care, these additional supply ports 30.1, 30.2 are covered by wall panels, which will be described further below. These supply ports 30.1, 30.2 in the supply port carriers 3.1, 3.2 provide additional supply media, which are needed or may be needed only in case of intensive care, but not in case of normal care. For example, a supply of current free from interruption, which also supplies a connected medical device with current, when the stationary voltage supply network is interrupted, is needed only in case of intensive care. Or else, a high-voltage current connection, e.g., for an x-ray machine, is used only in case of intensive care. The two supply unit carriers 3.1, 3.2 provide, for example, such additional electrical supply ports. A wastewater tank and a wastewater line for dialysis or for a urological examination are needed in one embodiment, and this examination is a component of an intensive care.

The supply ports 22.1, 22.2, 22.3 form the remaining set of the supply ports. The supply ports 22.1, 22.2, 22.3 and the supply ports 30.1, 30.2, 30.3 together form the total set of the supply ports.

In case of the configuration for intensive care, in addition, in the exemplary embodiment shown, a respective vertical holding rod 5.1, 5.2, which is not needed for normal care and has the respective form of a tube in the exemplary embodiment, is fastened in front of and below the supply port carrier 2.1, 2.2. For example, an input and output unit 7.2, which comprises a keyboard, a display screen and a holding arm and is mounted at the vertical rod 5.2, is, in addition, shown in FIG. 2.

Figure 3:
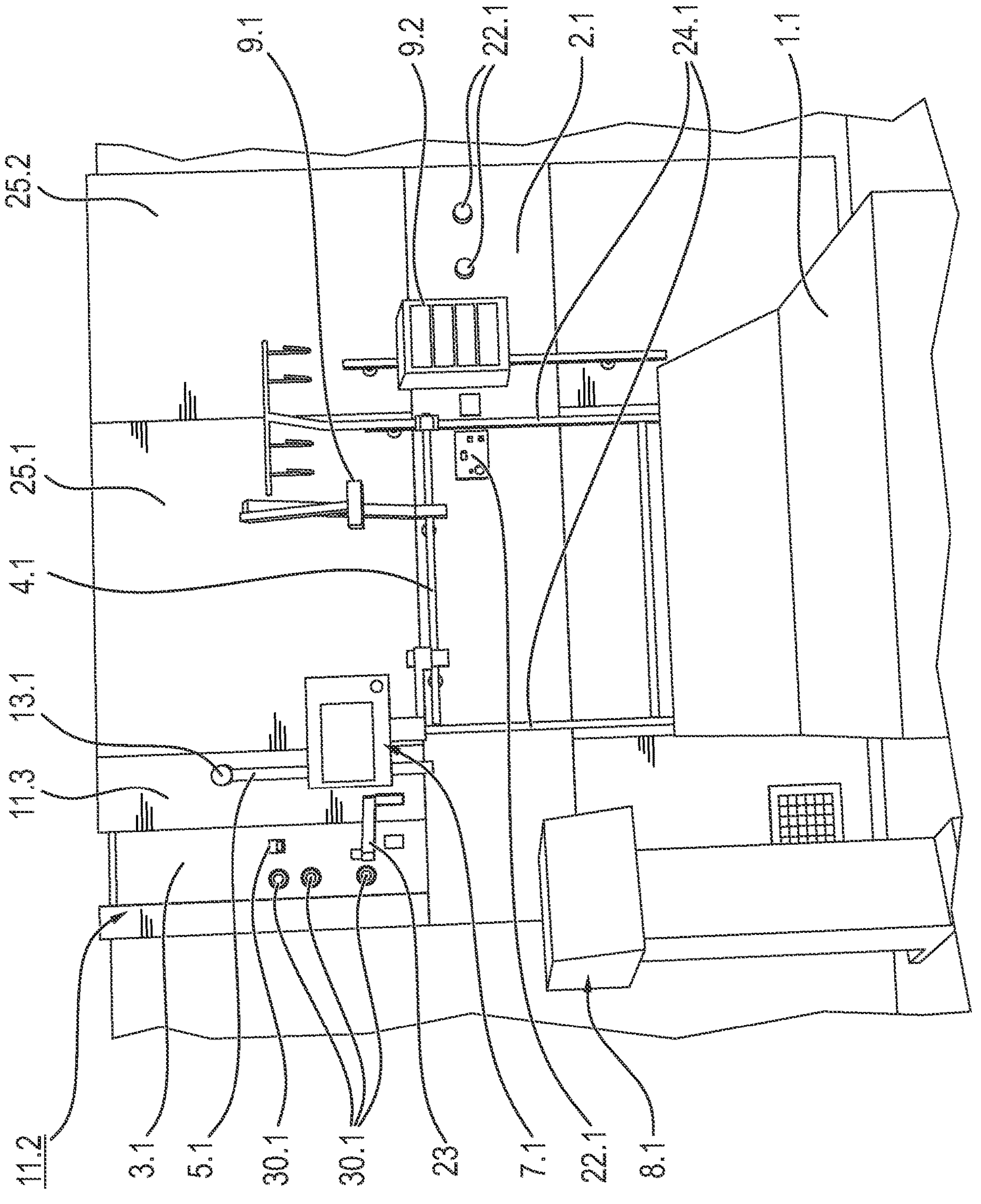
FIG. 3 is a perspective view showing an individual place for intensive care with a ventilator.

FIG. 3 shows an individual care place for intensive care, which is slightly changed compared to the embodiment according to FIG. 2. A plurality of supply ports 22.1 are provided in the supply port carrier 2.1. A supply port carrier 3.1 with supply ports 30.1, which are needed only for intensive care, is located above the supply port carrier 2.1. Three supply ports 30.1 for three fluids as well as an outlet for an Internet connection are shown in an exemplary manner. A ventilator 8.1 is connected via a hose to a supply port 30.1 of the supply port carrier 3.1, wherein this supply port 30.1 provides a fluid for the ventilator 8.1. A display screen 7.1 and an examination light 9.1 are fastened to the horizontal track 4.1, and a plurality of syringe pumps 9.2 are fastened to the vertical rod 5.1. In addition, two vertical tracks 24.1, which are also used in case of normal care, can be seen. In addition, a holding device 23 in the form of a double swivel arm, which is capable of carrying an additional medical device (not shown) and is detachably mounted, which will be described further below, belongs to the care place for intensive care.

Two detachably fastened wall panels 11.2 and 11.3 as well as two permanently mounted wall panels 25.1 and 25.2 are, moreover, shown in FIG. 3. These wall panels will be described further below.

A comparison of FIG. 1 with FIG. 2, on the one hand, and with FIG. 3, on the other hand, shows that a supply port carrier 3.1, 3.2 with supply ports 30.1, 30.2, which are needed only for intensive care, is hidden by a wall panel, when this care place is used for normal care. This wall panel covers the supply ports 30.1, 30.2 from the front when the care place is used for normal care, i.e., is located between the supply ports 30.1, 30.2 and the hospital room. This embodiment protects the supply ports 30.1, 30.2 against mechanical damage and reduces the effort, which is necessary for the necessary cleaning and disinfection.

Figure 4A:
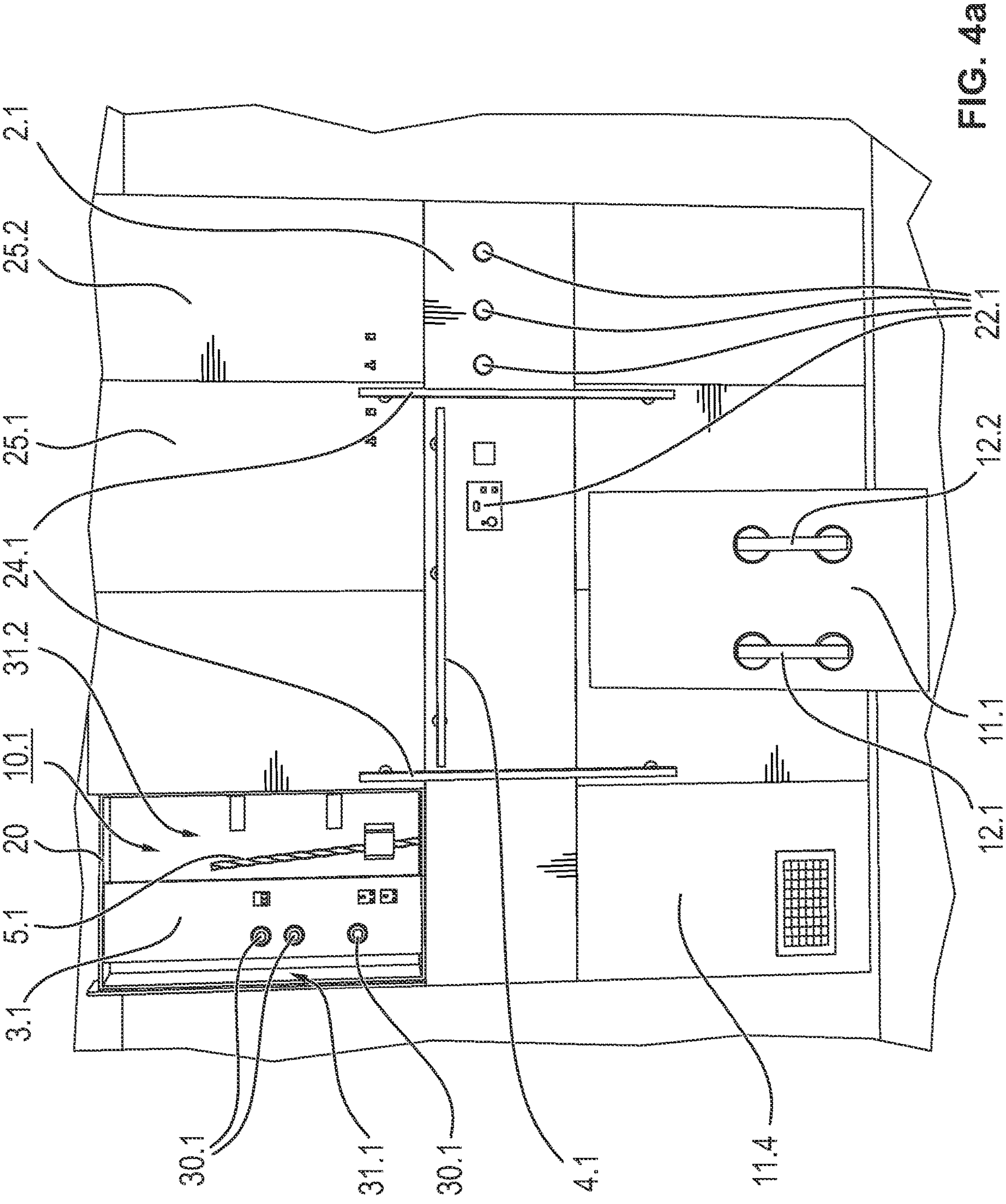
FIG. 4*a* is a perspective view showing a situation in case of a conversion of a care place.

FIGS. 4*a* and 4*b* and FIGS. 5*a*, 5*b* and 5*c* show a situation in case of the conversion of a care place, i.e., while a care place is converted from the configuration for normal care to a configuration for intensive care or vice versa. FIG. 4*a* shows the care place from FIG. 3 without the hospital bed 1.1 and without the medical devices 8.1, 9.1, 9.2. The supply port carrier 2.1, the horizontal track 4.1 and the vertical tracks 24.1, which are also used for normal care, as well as the supply port carrier 3.1, which is used only for intensive care, can be seen.

In addition, a chamber 10.1, which encloses the supply port carrier 3.1 and is provided by the frame 20, can be seen. In the chamber 10.1, two spaces 31.1 and 31.2 are left free to the left and to the right of the supply port carrier 3.1. For what these spaces 31.1, 31.2 can be used will be described further below. The vertical rod 5.1 is needed only for intensive care, but not for normal care. The chamber 10.1 accommodates the vertical rod 5.1 when this vertical rod 5.1 is not needed.

A continuous wall panel 11.1 covers the chamber 10.1 when the care place from FIG. 3 and FIG. 4 is used in normal care and hence the supply ports 30.1 of the supply port carrier 3.1 are not needed. The chamber 10.1 is then not visible from outside. FIG. 4 *b*) shows the configuration for normal care. The wall panel 11.1 is inserted in front of the chamber 10.1 and is held detachably at the frame 20, preferably by means of suction fasteners, snap-in fasteners and/or snap fasteners, so that no tool is needed for mounting and removal. The detachably fastened wall panel 11.1 forms with the permanently mounted wall panels 25.1, 25.2 a continuous surface above the supply port carrier 2.1. In the situation that is shown in FIG. 4*a*, the wall panel 11.1 is on the floor, and the wall panels 25.1, 25.2 are, furthermore, fastened to the frame 20.

In the embodiment shown, the wall panel 11.1 can be gripped and moved by means of two suction grippers 12.1 and 12.2. A user places the two suction grippers 12.1, 12.2 onto the wall panel 11.1, generates a vacuum, moves the wall panel 11.1 to the desired place, cancels the vacuum and again removes the suction grippers 12.1, 12.2 from the wall panel 11.1.

Figure 5C:
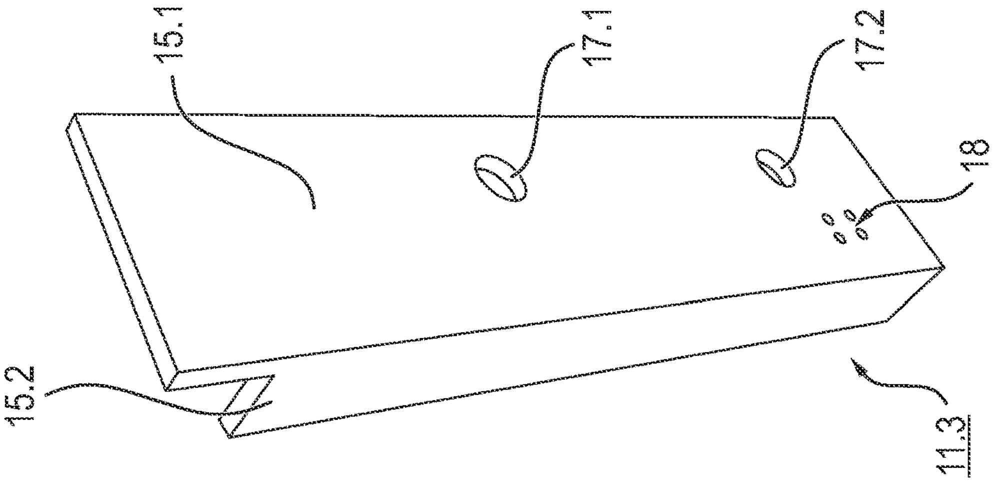
FIG. 5*c* is a perspective view showing a right-hand detachably mountable wall panel.
Figure 5B:
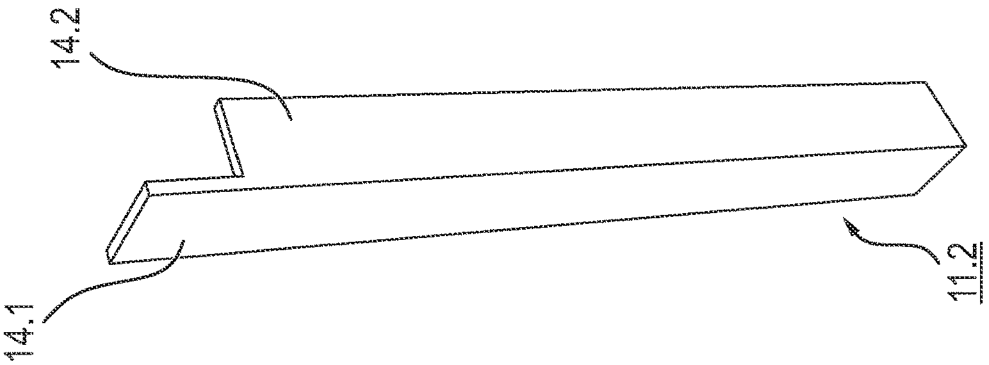
FIG. 5*b* is a perspective view showing a left-hand detachably mountable wall panel.
Figure 5A:
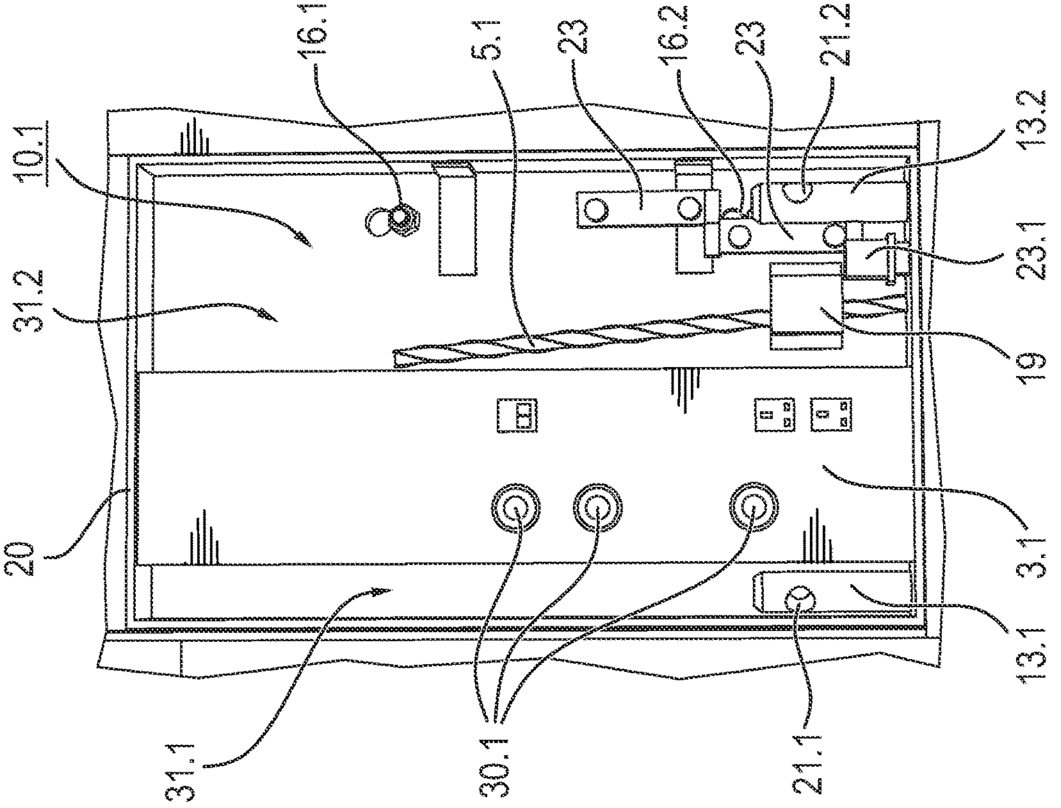
FIG. 5*a* is a perspective view showing the situation from FIG. 4*a;*

FIG. 5*a* shows in an enlargement of FIG. 4*a* the chamber 10.1 and the supply port carrier 3.1, wherein the wall panel 11.1 is removed. The chamber 10.1 accommodates the vertical rod 5.1 as well as two rod mounts 13.1, 13.2. The vertical rod 5.1 can be fastened by means of these rod mounts 13.1, 13.2, which will be described below. In addition, the chamber 10.1 is capable of accommodating a holding device 23 for a medical device, not shown. The mounted holding device 23 can be seen in FIG. 3. In this case, the holding device is a double swivel arm, i.e., a device with two rotating arms, which are parallel to one another and are spaced apart from each other, and comprises a mounting plate 23.1.

FIG. 5*b* shows a left wall panel 11.2 with two segments 14.1, 14.2, which are perpendicular to each other. This left wall panel 11.2 is inserted to the left of the supply port carrier 3.1 when the care place is used for intensive care and therefore at least one supply port 30.1 in the supply port carrier 3.1 is used or at least shall be able to be used and therefore must not be hidden. The left wall panel 11.2 is then inserted such that the segment 14.1 lies in the wall plane and the segment 14.2 protrudes into the chamber 10.1. The left wall panel 11.2 covers the space 31.1, i.e., the part of the chamber 10.1, which is located to the left of the supply port carrier 3.1. FIG. 3 shows the inserted left wall panel 11.2.

FIG. 5*c* shows a right-hand wall panel 11.3 with two segments 15.1, 15.2, which are perpendicular to each other. The right-hand wall panel 11.3 is inserted to the right of the supply port carrier 3.1 when the care place is used for intensive care. The right-hand wall panel 11.3 is then inserted such that the segment 15.1 lies in the wall plane and the segment 15.2 protrudes into the chamber 10.1. The right-hand wall panel 11.3 covers the space 31.2, i.e., the part of the chamber 10.1, which is located to the right of the supply port carrier 3.1. FIG. 3 shows the inserted right-hand wall panel 11.3.

Two round openings 17.1, 17.2 are provided above one another in the segment 15.1 of the right-hand wall panel 11.3. When the right-hand wall panel 11.3 is arranged and detachably fastened in front of the chamber 10.1, these openings 17.1, 17.2 are located in front of two fastening elements 16.1, 16.2 on the rear wall of the chamber 10.1. The two rod mounts 13.1, 13.2 can be pushed through these openings 17.1, 17.2 in case of an inserted right-hand wall panel 11.3 and can be detachably connected to the fastening elements 16.1, 16.2. For example, each rod mount 13.1, 13.2 has an internal thread and each fastening element 16.1, 16.2 has a corresponding external thread or vice versa. The two rod mounts 13.1, 13.2 can be screwed onto the fastening elements 16.1, 16.2. The vertical rod 5.1 can subsequently be pushed through two receiving openings 21.1, 21.2 into the rod mounts 13.1 and 13.2 and be fastened.

In addition, four openings 18 are provided in the segment 15.1. Receiving elements 19 for four fastening elements, for example, screws, not shown, are present on the rear wall of the chamber 10.1. These fastening elements can be passed through the openings 18 and fastened, for example, screwed into the receiving elements 19.

In one embodiment, the right-hand wall panel 11.3 can be detachably fastened in front of the chamber 10.1 by means of fastening elements, which are passed through the openings 18 and are inserted into the receiving elements 19. In this manner, the risk that the right-hand wall panel 11.3 falls from the wall when a device is fastened to the rod 5.1 is reduced.

In another embodiment, a holding device can be fastened by means of fastening elements, these fastening elements being passed through the openings 18 and fastened in the receiving elements 19. For example, the mounting plate 23.1 of the holding device 23 can be fastened with such fastening elements, wherein the holding device 23 is shown in FIG. 3 in the mounted position and is accommodated by the chamber 10.1 in the removed position, cf. FIG. 5*a*.

In the just described embodiment, the openings 17.1, 17.2 are used to pass the rod mounts 13.1, 13.2 through the right-hand wall panel 11.3 and detachably fasten same to the fastening elements 16.1, 16.2. In an alternative embodiment, which is not shown, a supply port is located in the rear wall of the chamber 10.1 at the location of a fastening element 16.1, 16.2. A connection unit, for example, a hose, a tube or a cable, can be passed through the opening 17.1, 17.2 and be detachably connected to this supply port. In one embodiment, this connection unit is passed through the opening 17.1, 17.2 such that the connection unit closes the opening 17.1, 17.2 in a fluid-tight manner. This supply port is needed only for intensive care. This supply port is hidden by the wall panel 11.1 in case of normal care.

Figure 6:
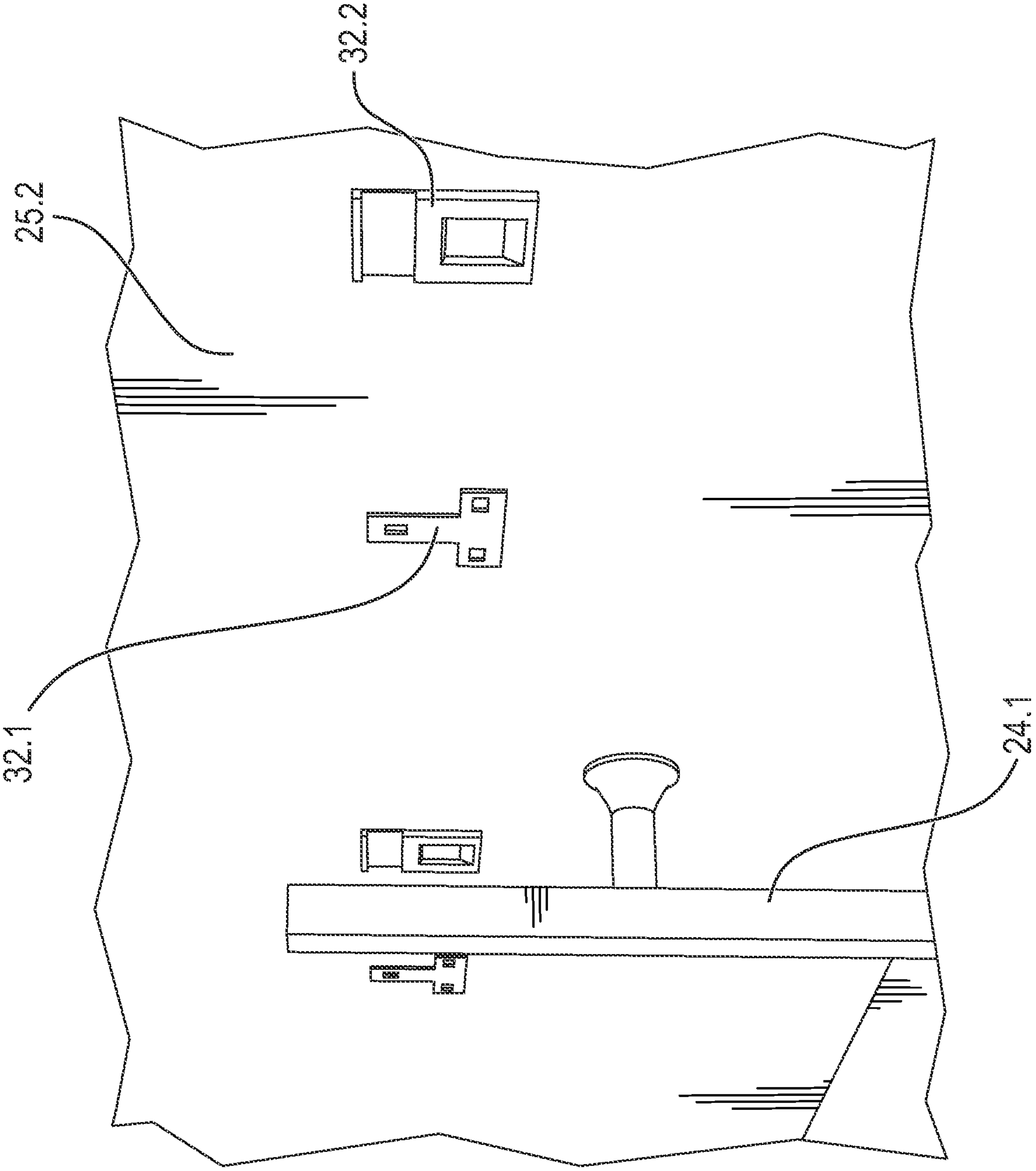
FIG. 6 is a perspective view showing a plurality of supply ports in a wall panel.

In another embodiment, a supply port is provided in a wall panel. FIG. 6 shows, as an example, a plurality of supply ports 32.1, 32.2 in the permanently mounted wall panel 25.2. The supply ports 32.1, 32.2 in this example are connections to a stationary data network. It is also possible that at least one supply port is provided in a detachably mountable wall panel 11.1, 11.2, 11.3. In both embodiments, this supply port 32.1, 32.2 is connected to a coupling unit in the frame 20 in the wall panel via a suitable connection unit, for example, a cable, a hose or a tube. In case the supply port is provided in a detachably mounted wall panel 11.1, 11.2, 11.3, this connection unit is then detachably connected to the coupling unit in the frame 20 via a suitable coupling unit, for example, via a plug or via a plug-in connection or screw connection, if the wall panel is fastened to the frame 20.

Figure 7:
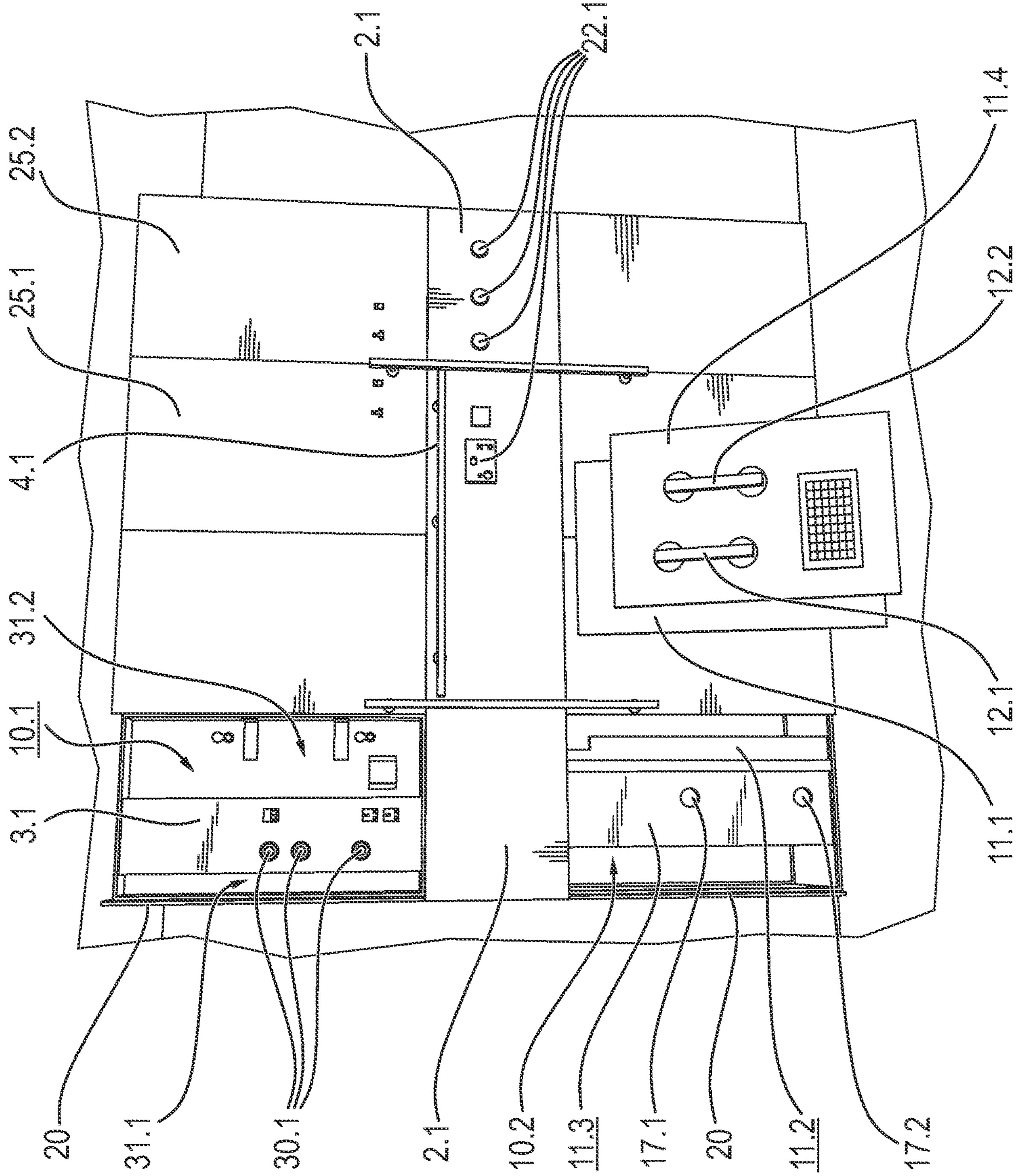
FIG. 7 is a perspective view showing the situation from FIG. 4*a*, wherein one chamber is open for wall panels.

The two wall panels 11.2 and 11.3 are not needed in case of normal care. FIG. 7 shows a chamber 10.2, which accommodates the two wall panels 11.2 and 11.3 in case of normal care. This additional chamber 10.2 is covered by a wall panel 11.4, which is shown in FIG. 7 behind the wall panel 11.1. The wall panel 11.4 can also be moved by means of suction grippers. In the situation, which is shown in FIG. 4*a*, the chamber 10.2 is covered by the wall panel 11.4. The chamber 10.2 preferably accommodates the wall panel 11.1 in case of intensive care, which wall panel 11.1 is then not needed. The chamber 10.2 is also covered by the wall panel 11.4 in case of intensive care.

Figure 8:
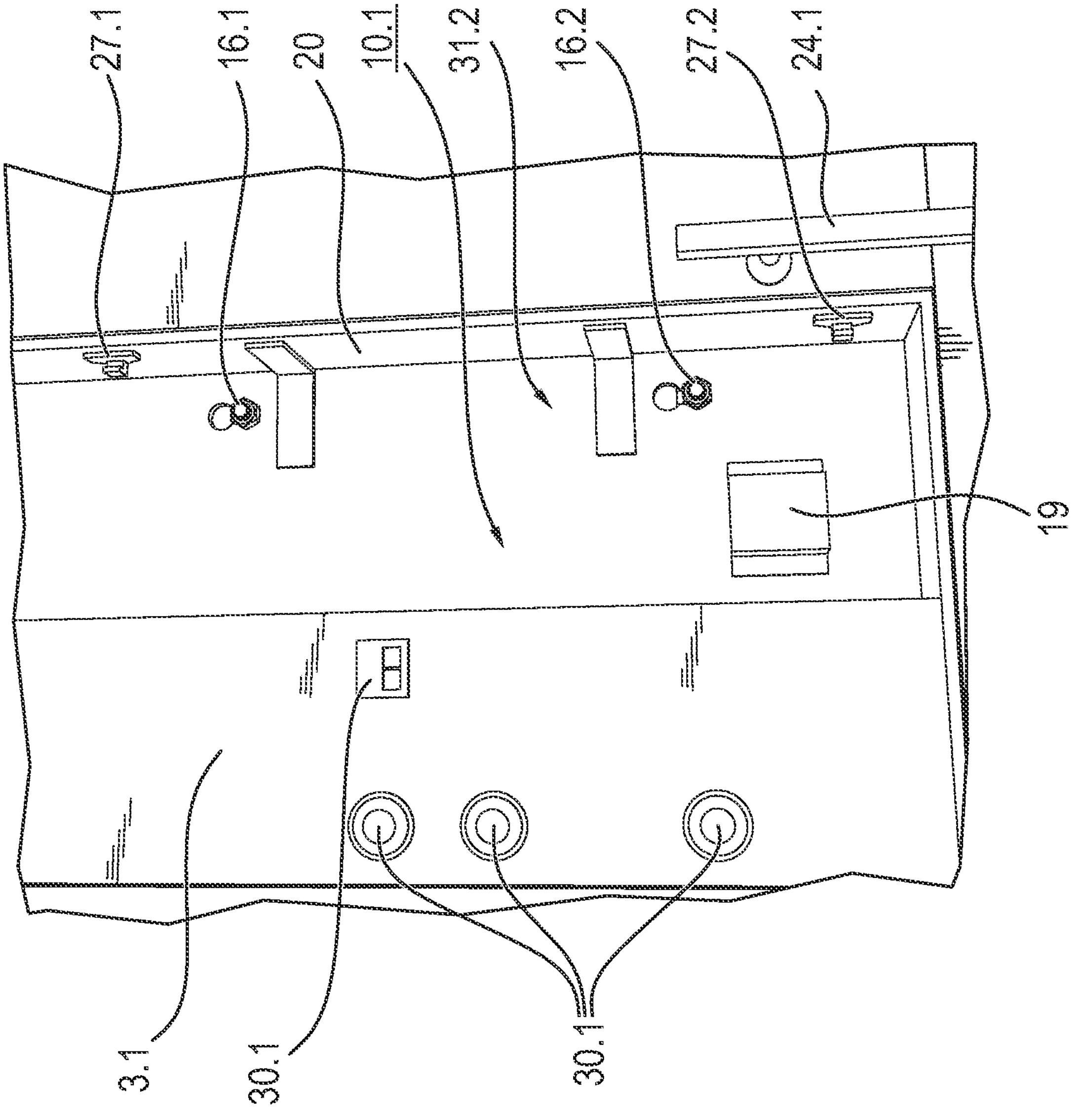
FIG. 8 is a perspective view showing the chamber from FIG. 7 in a detailed view.

FIG. 8 shows a part of the chamber 10.1, wherein loose objects are removed from the chamber 10.1. The two fastening elements 16.1, 16.2, which are capable of holding the two rod mounts 13.1, 13.2, can be seen on the rear wall. This rear wall belongs to the frame 20, which will be described further below. In addition, the receiving elements 19 can be seen.

Figure 9B:
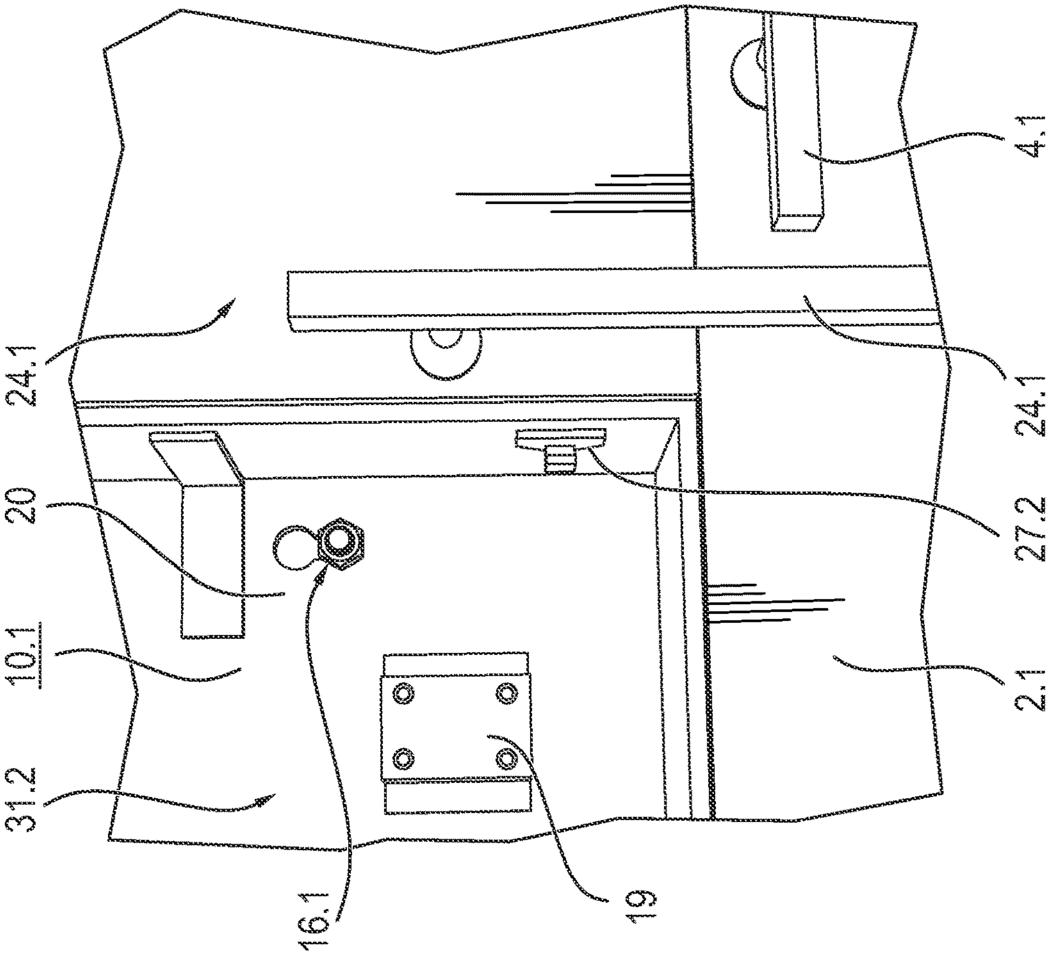
FIG. 9*b* is a perspective view further illustrating the embodiment of how a wall panel is fastened to the frame.
Figure 9A:
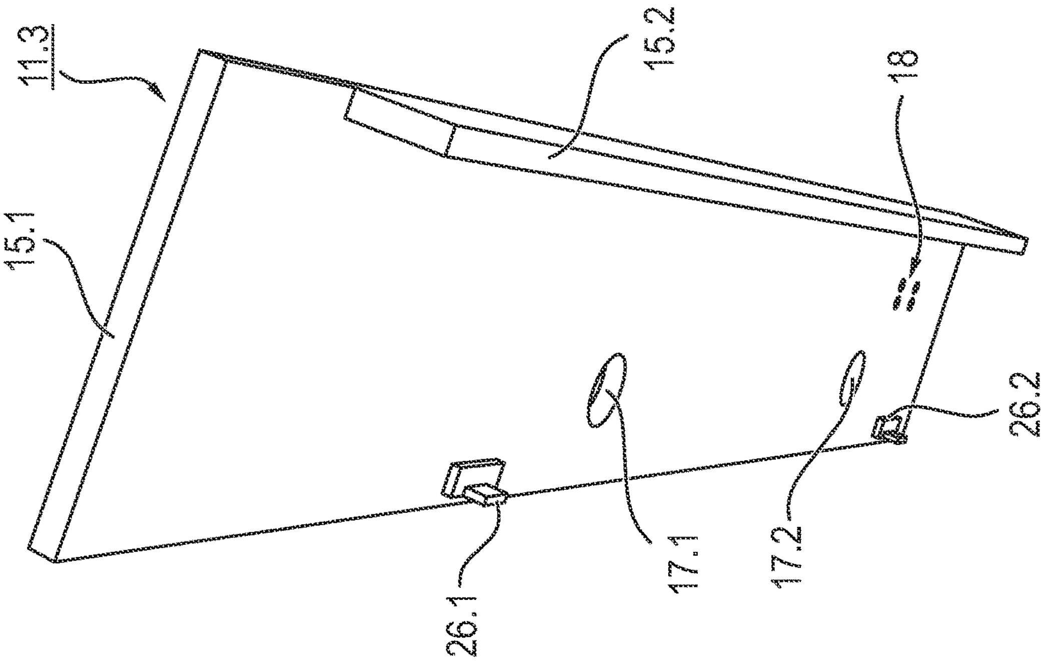
FIG. 9*a* is a perspective view showing a wall panel to illustrate an exemplary embodiment of how a wall panel is fastened to the frame.

Moreover, FIG. 8 and FIG. 9 show an exemplary embodiment of how a wall panel is fastened detachably to the frame 20. Two frame-side fastening elements 27.1, 27.2 are fastened to the rear wall of the chamber 10.1, cf. FIG. 9 *b*). Two panel-side fastening elements 26.1, 26.2 are fastened to a rear side of the wall panel 11.3, shown as an example, cf. FIG. 9 *a*). When the wall panel 11.3 is moved towards the rear wall in the correct position, then the panel-side fastening elements 26.1, 26.2 are pushed like a plug into the frame-side fastening elements 27.1, 27.2 or like a sleeve over the frame-side fastening elements 27.1, 27.2. The panel-side fastening elements 26.1, 26.2 preferably snap in when the wall panel 11.3 has reached the desired mounting position at the frame 20.

Figure 10:
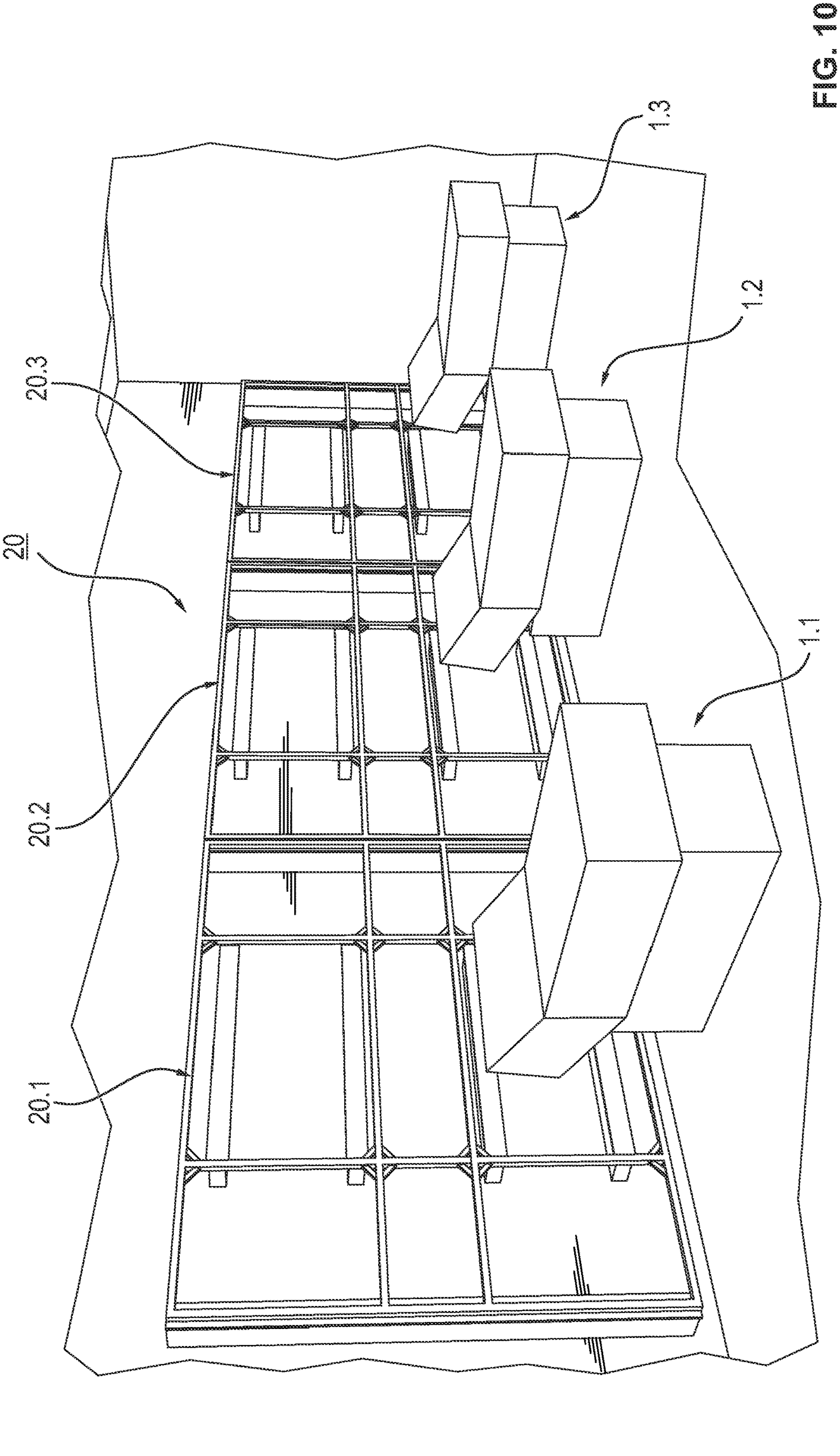
FIG. 10 is a perspective view showing a frame for the supply port carrier and wall panels.

FIG. 10 shows the already mentioned frame 20 with three segments 20.1, 20.2, 20.3 for the three care places from FIG. 1. The frame 20 is mounted permanently on a wall of the hospital room shown. The frame 20 provides the two chambers 10.1, 10.2 as well as additional chambers and is preferably manufactured from aluminum or from another metal. Each segment 20.1, 20.2, 20.3 of the frame 20 comprises the supply port carrier and optionally the rods and/or tracks for a respective care place, supports the mounted wall panel for this care place and provides the just described chambers 10.1 and 10.2 as well as the corresponding additional chambers.

Figure 11:
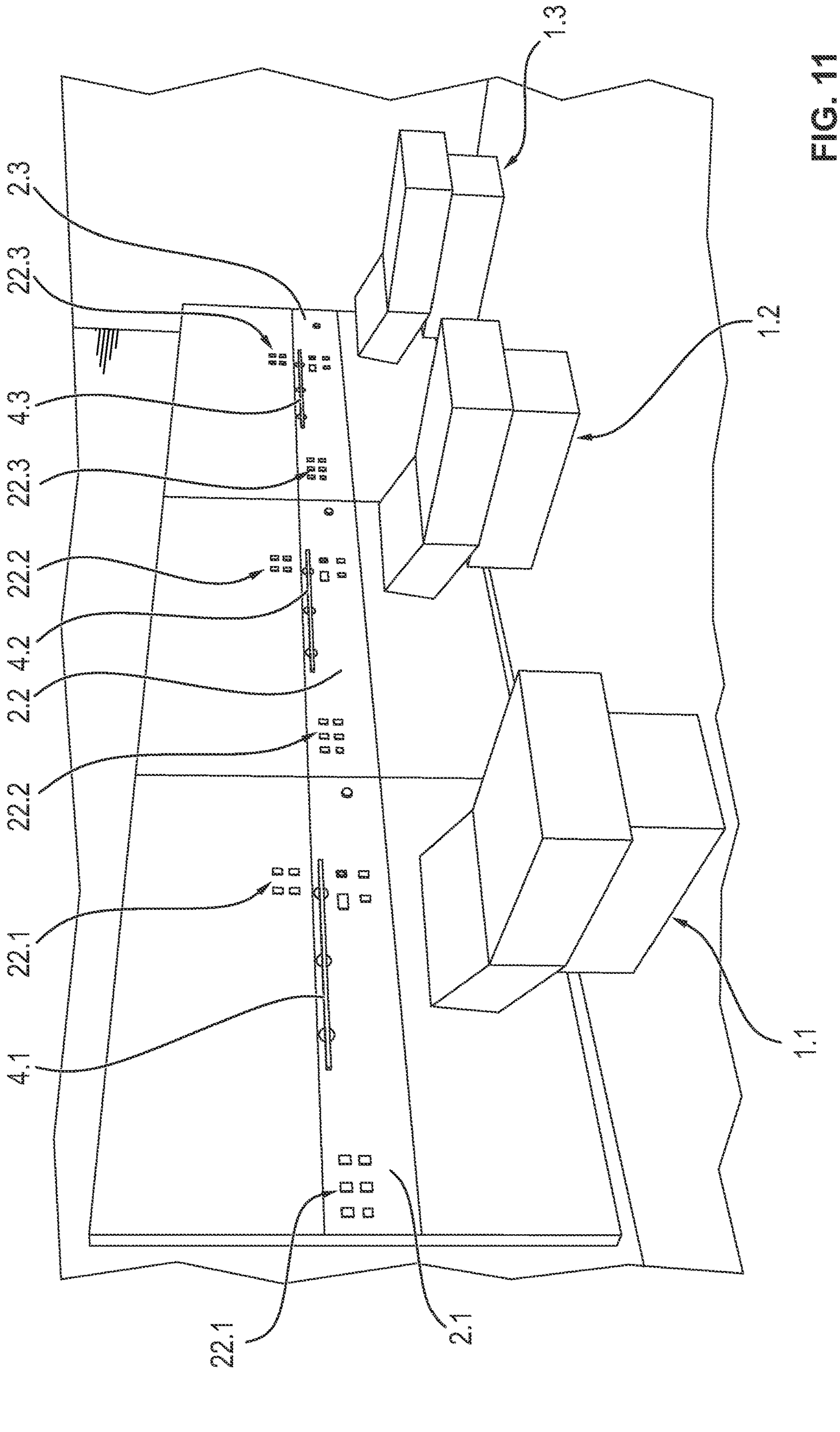
FIG. 11 is a perspective view showing a hospital room with the frame from FIG. 10, configured for normal care.
Figure 12:
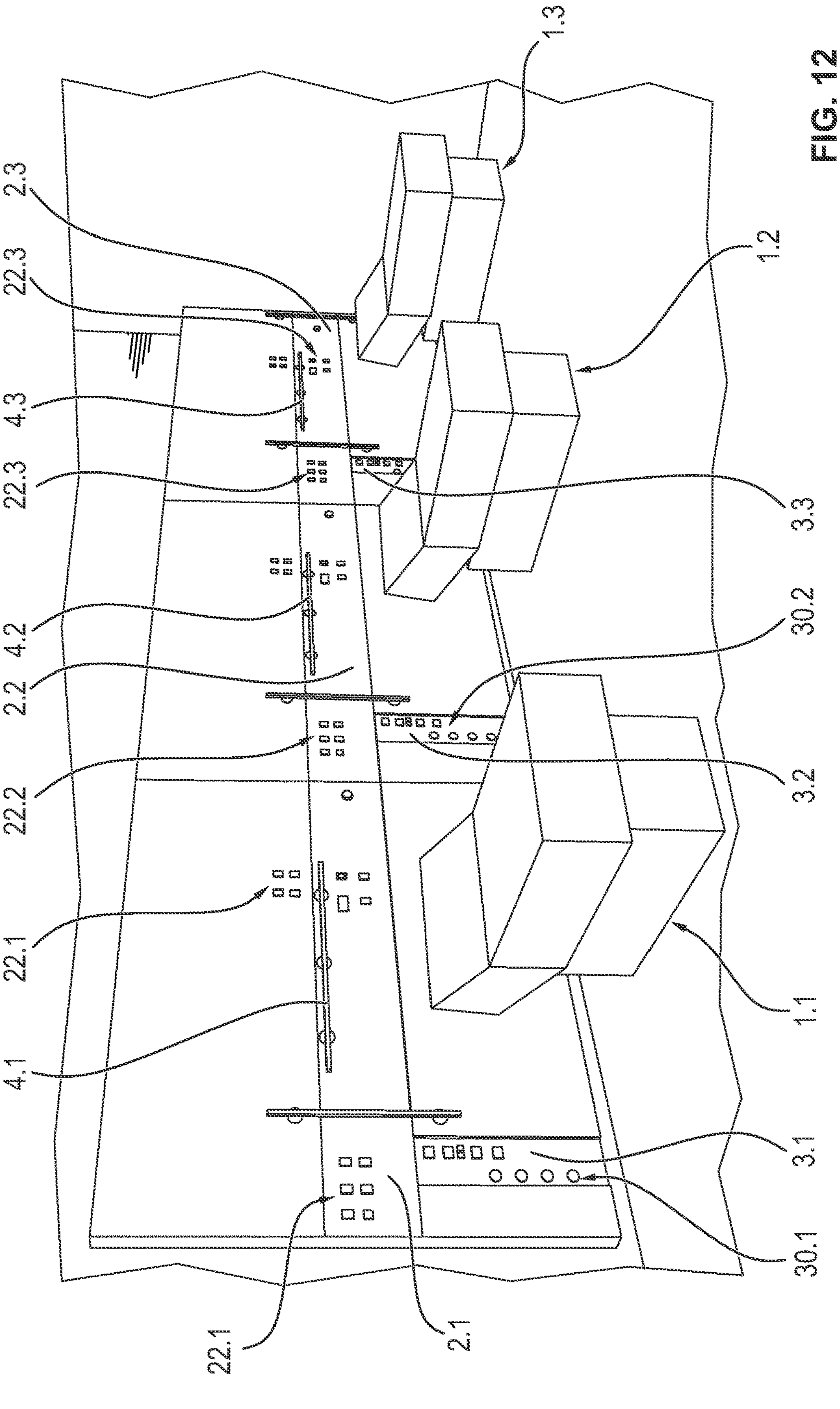
FIG. 12 is a perspective view showing a hospital room with the frame from FIG. 10, configured for intensive care.

FIG. 11 shows the configuration for normal care, and FIG. 12 shows the configuration for intensive care. In this embodiment, three hospital beds 1.1, 1.2 and 1.3 are used not only for normal care, but also for intensive care. Both configurations are produced by means of the frame 20 from FIG. 10.

How a care place is converted from normal care to intensive care will be described below as an example. The starting point is a configuration for normal care, which is shown, for example, in FIG. 1 and in FIG. 11. The chamber 10.1 is closed by the wall panel 11.1, cf. FIG. 4 *b*). The steps described below are carried out, especially preferably by a person, during the conversion. As a rule, a person can carry out the steps described below alone. It is also conceivable that these steps are carried out by an automatic manipulating unit.

Figure 4B:
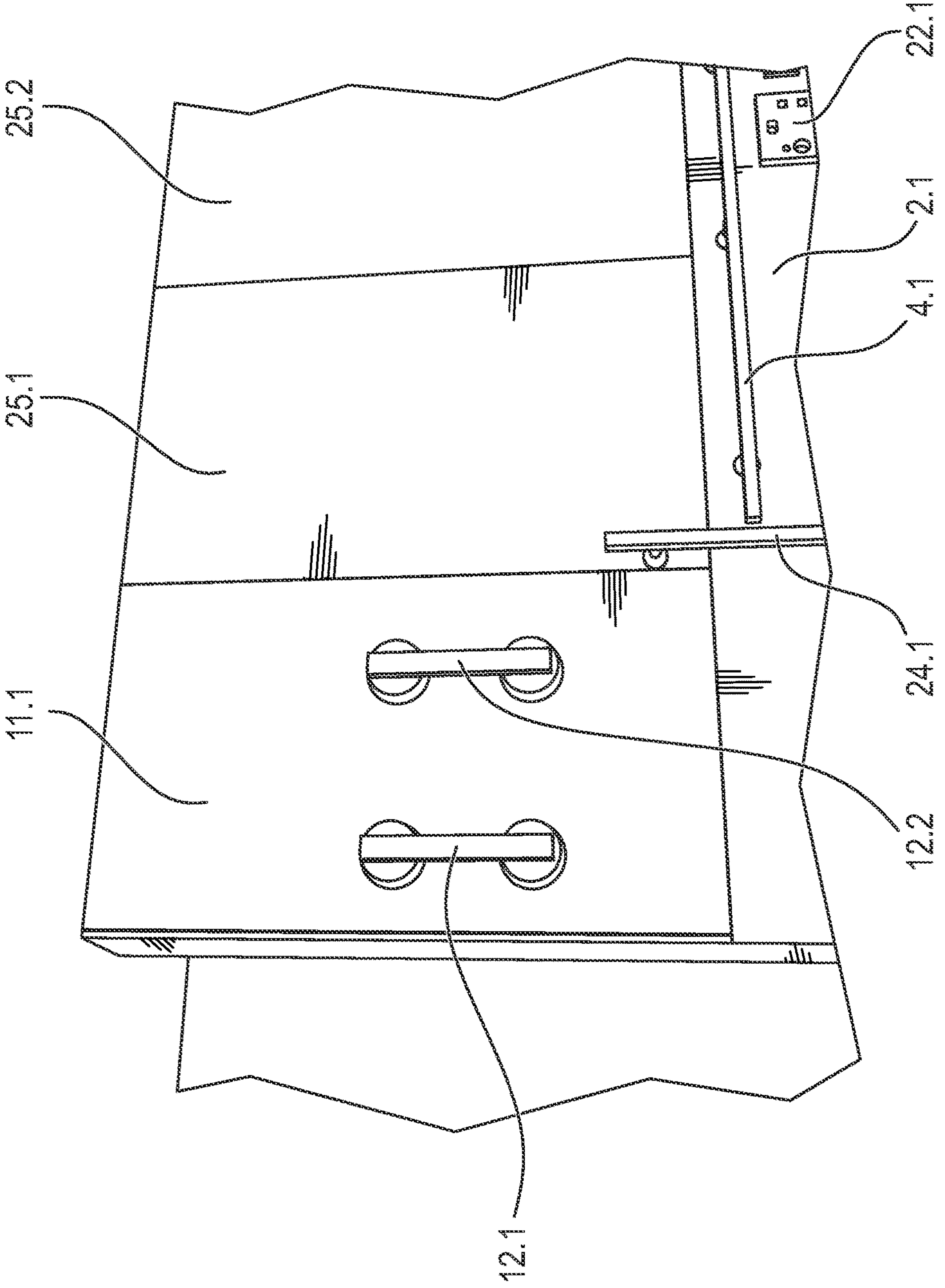
FIG. 4*b* is a perspective view showing the care place of FIG. 4*a* converted for normal care.

The two suction grippers 12.1, 12.2 are placed from outside onto the wall panel 11.1. The wall panel 11.1 is detachably mounted in front of the chamber 10.1. This state is shown in FIG. 4*b*.

The wall panel 11.1 is removed from the frame 20 by means of the two suction grippers 12.1, 12.2 and placed on the floor. The chamber 10.1 is now accessible from outside. This situation is shown in FIG. 4*a*.

The two suction grippers 12.1, 12.2 are placed from outside onto the wall panel 11.4. The wall panel 11.4 is detachably mounted in front of the chamber 10.2.

The wall panel 11.4 is removed from the frame 20 by means of the two suction grippers 12.1, 12.2 and placed on the floor, for example, in front of the wall panel 11.1. FIG. 7 shows the situation now achieved. The chambers 10.1 and 10.2 are now open.

The left-hand wall panel 11.2 and the right-hand wall panel 11.3 are removed from the chamber 10.2. FIG. 5*b* and FIG. 5*c* show this situation. In addition, the holding device 23, the vertical rod 5.1 and the two rod mounts 13.1, 13.2 are removed from the chamber 10.2.

The wall panel 11.1 is inserted into the chamber 10.2, for example, obliquely, so that it passes into the chamber 10.2. The wall panel 11.4 is detachably mounted at the frame 20 in front of the chamber 10.2. These two steps are preferably carried out, in turn, with the suction grippers 12.1, 12.2.

The left-hand wall panel 11.2 is detachably fastened to the frame 20 to the left of the supply port carrier 3.1, and the right-hand wall panel 11.3 is detachably fastened to the right of the supply port carrier 3.1. In this case, the panel-side fastening elements 26.1, 26.2 at the right-hand wall panel 11.3 are pushed over or into the frame-side fastening elements 27.1, 27.2. The left-hand wall panel 11.2 is detachably fastened to the frame 20 in the same manner.

The holding device (double swivel arm) 23 is fastened to the right-hand wall panel 11.3. For this purpose, the mounting plate 23.1 is held in front of the openings 18. Four screws or other fastening elements are passed through the mounting plate 23.1 and through the openings 18 and screwed into the receiving elements 19 on the rear wall of the chamber 10.1 or inserted in a different manner.

The two rod mounts 13.1, 13.2 are pushed through the two openings 17.1, 17.2 in the right-hand wall panel 11.3 and screwed onto the two fastening elements 16.1, 16.2 on the rear wall of the chamber 10.1. After the screwing on, the two rod mounts 13.1, 13.2 are in a position, in which the two receiving openings 21.1, 21.2 extend along a vertical axis.

The vertical tube 5.1 is pushed through the two receiving openings 21.1, 21.2 and fastened by means of fastening elements, for example, screws, not shown. The situation achieved can be seen in FIG. 3.

The situation which is shown in FIG. 3 is now achieved. An intensive care place is available.

Of course, individual steps may also be carried out in a different order.

The corresponding steps in reverse order are carried out to make a normal care place from the intensive care place again.

While specific embodiments of the invention have been shown and described in detail to illustrate the application of the principles of the invention, it will be understood that the invention may be embodied otherwise without departing from such principles.

LIST OF REFERENCE NUMBERS

- 1.1, 1.2, . . . Hospital beds
- 2.1, 2.2, . . . Supply port carrier; it carries the supply ports 22.1, 22.2, . . .
- 3.1, 3.2 Supply port carrier; it carries the supply ports 30.1, 30.2, . . .
- 4.1, 4.2, . . . Horizontal tracks at the supply port carrier 2.1, 2.2, 2.3, also used in normal care
- 5.1, 5.2 Vertical rods, used only for intensive care
- 6.1, 6.2, . . . Illuminating units at the horizontal track 4.1, 4.2, . . .
- 7.1, 7.2 Input and output units at the vertical rod 5.1, 5.2
- 8.1 Ventilator, connected to a supply port 30.1 in the supply port carrier 3.1
- 9.1 Examination light
- 9.2 Syringe pumps
- 10.1 Chamber that accommodates the vertical rod 5.1 and the fastening elements 13.1, 13.2 during normal care and is covered by the wall panel 11
- 10.2 Chamber that accommodates the wall panels 11.2 and 11.3 during normal care and accommodates the wall panel 11.1 during intensive care, covered by the wall panel 11.4
- 11.1 Continuous detachably mountable wall panel; it is detachably fastened to the frame 20 in front of the chamber 10.1 during normal care
- 11.2 Left-hand detachably mountable wall panel; it is detachably fastened in front of the chamber 10.1 and to the left of the supply port carrier 3.1 during intensive care; it is accommodated by the chamber 10.2 during normal care; it comprises the segments 14.1, 14.2
- 11.3 Right-hand detachably mountable wall panel; it is detachably fastened in front of the chamber 10.1 and to the right of the supply port carrier 3.1 during intensive care; it is accommodated by the chamber 10.2 during normal care, it comprises the segments 15.1, 15.2
- 11.4 Detachably mountable wall panel for the chamber 10.2; it is detachably fastened to the frame 20 both during normal care and during intensive care
- 12.1, 12.2 Suction grippers for moving the wall panels 11.1, 11.4
- 13.1, 13.2 Rod mounts for fastening the vertical rod; they can be passed through the openings 17.1, 17.2 and screwed onto the fastening elements 16.1, 16.2
- 14.1, 14.2 Segments of the left-hand wall panel 11.2
- 15.1 Segment of the right-hand wall panel 11.3, it has the openings 17.1, 17.2, 18
- 15.2 Additional segment of the right-hand wall panel 11.3

16.1, 16.2 Fastening elements for the rod mounts 13.1, 13.2, mounted on the rear wall of the chamber 10.1

17.1, 17.2 Openings in the segment 15.1 for passing through the rod mounts 13.1, 13.2

18 Openings in the segment 15.1 for passing through four fastening elements, which are received by the receiving elements 19

19 Receiving elements on the rear wall of the chamber 10.1, which are capable of receiving fastening elements, wherein these fastening elements are passed through the openings 18

20 Permanently mounted frame; it comprises the supply port carriers 2.1, 2.2, . . . , 3.1, 3.2; it is capable of supporting the wall panels 11.1, 11.2, 11.3, 25.1, . . . ; it is split into the frame segments 20.1, 20.2, 20.3

21.1, 21.2 Receiving openings in the rod mounts 13.1, 13.2, through which the vertical tube 5.1 can be pushed

22.1, 22.2, . . . Supply ports in the frame segment 2.1, 2.2, . . . ; they are needed for intensive care and normal care; they belong to the remaining set

23 Holding device, which can be fastened to the receiving elements 19 by means of fastening elements, wherein these fastening elements are passed through the openings 18; it is configured as a double swivel arm with the mounting plate 23.1; it is needed only during intensive care

23.1 Mounting plate of the holding device 23

24.1 Vertical tracks to the left of and to the right of the horizontal track 4.1

25.1, . . . Wall panels, which are permanently fastened to the frame 20

26.1, 26.2 Panel-side fastening elements; together with the frame-side fastening elements

26.1, 26.2, they establish a plug-in connection for the wall panel 11.3

27.1, 27.2 Frame-side fastening elements; together with the panel-side fastening elements

26.1, 26.2, they establish a plug-in connection for the wall panel 11.3

30.1, 30.2, . . . Supply ports in the frame segment 3.1, 3.2, . . . ; they are needed only for intensive care; they belong to the total set, but not to the remaining set

31.1, 31.2 Spaces in the chamber 10.1, which are formed to the left of and to the right of the supply port carrier 3.1

32.1, 32.2 Supply ports in the wall panel 25.2

The invention claimed is:

1. An assembly for providing medical care of a patient, the assembly comprising:

a total set of supply ports, wherein the total set of supply ports comprises at least two supply ports, wherein each of the at least two supply ports provides a respective supply medium configured for supplying medical devices, wherein the total set of the supply ports are all configured to supply the medical devices, which are used for intensive care of the patient, with the respective supply media;

a frame;

at least one detachably mountable wall panel removably attached to the frame; and a wall panel fastening unit configured for removably attaching the at least one detachably mountable wall panel to the frame, wherein the wall panel fastening unit is configured to detachably hold the at least one detachably mountable wall panel at the frame, wherein with the at least one detachably mountable wall panel fastened to the frame, movement of the at least one detachably mountable wall panel in relation to the frame is prevented, wherein with the at least one detachably mountable wall panel detached from the frame, the at least one detachably mountable wall panel is freely movable in relation to the frame and is removable therefrom, wherein the assembly is configured such that with the at least one detachably mountable wall panel fastened to the frame, at least one supply port of the total set of supply ports is hidden and a remaining set of supply ports of the total set of supply ports remains exposed, wherein the remaining set of supply ports comprises at least one supply port of the total set of supply ports, and at least one supply port of the total set of supply ports does not belong to the remaining set of supply ports, and wherein the remaining set of supply ports are all configured to supply the medical devices that are used for normal, non-intensive care of the patient with the respective supply media.

2. The assembly in accordance with claim 1, wherein the assembly comprises at least two detachably mountable wall panels, wherein the assembly is configured such that when both of the at least two detachably mountable wall panels are mounted at the frame, at least two supply ports of the total set of supply ports are hidden, and the remaining set of supply ports, comprising at least two additional supply ports of the total set of supply ports, remains exposed.

3. The assembly in accordance with claim 1, wherein the frame comprises a supply port carrier, which accommodates at least one supply port of the total set of supply ports, wherein the at least one supply port accommodated by the supply port carrier does not belong to the remaining set of supply ports, and wherein with the at least one detachably mountable wall panel mounted at the frame, the at least one detachably mountable wall panel is configured to hide this supply port carrier as well as the at least one supply port accommodated by the supply port carrier.

4. The assembly in accordance with claim 1, wherein the assembly comprises a wall panel supply port and a coupling unit, wherein the coupling unit is configured to detachably connect a device to the wall panel supply port, and wherein the wall panel supply port is provided in a respective wall panel and is connectable to the coupling unit.

5. The assembly in accordance with claim 1, wherein the wall panel fastening unit is configured as a suction connection or as a snap-in connection.

6. The assembly in accordance with claim 1, further comprising a manipulating unit configured to detachably connect to the at least one detachably mountable wall panel and to support the at least one detachably mountable wall panel connected thereto.

7. The assembly in accordance with claim 1, wherein a detachably mountable normal care wall panel and a detachably mountable intensive care wall panel are provided as the at least one detachably mountable wall panel, wherein the assembly further comprises:

a holding device; and a holding device fastening unit, wherein the holding device is configured to hold a medical device needed for intensive care, wherein the holding device fastening unit is fastened to the frame, and is configured to detachably fasten the holding device to the frame, wherein at least one opening is provided in the intensive care detachably mountable wall panel, wherein with the holding device and the intensive care detachably mountable wall panel detachably fastened to the frame, one element of the holding device is passed through the opening, and is detachably connected to the holding device fastening unit, and wherein with the normal care wall fastened to the frame, the normal care detachably mountable wall panel hides the holding device fastening unit.

8. The assembly in accordance with claim 7, wherein the frame provides at least one chamber, wherein the chamber is configured to accommodate the holding device detached from the frame, wherein the holding device fastening unit is located in an interior of the chamber, and wherein with the normal care wall fastened to the frame, the normal care detachably mountable wall panel hides the chamber with the holding device fastening unit.

9. The assembly in accordance with claim 1, wherein the at least one detachably mountable wall panel is a first detachably mountable wall panel and the assembly further comprises at least one second detachably mountable wall panel, wherein the frame provides at least one chamber, wherein the at least one chamber is configured for accommodating the at least one second detachably mountable wall panel, and wherein with the first detachably mountable wall panel detachably fastened to the frame, the first detachably mountable wall panel closes the chamber together with the accommodated at least one second detachably mountable wall panel.

10. The assembly in accordance with claim 9, wherein with the at least one second detachably mountable wall panel fastened to the frame, the at least one second detachably mountable wall panel hides at least one supply port, which belongs to the total set of supply ports, but not to the remaining set of supply ports.

11. The assembly in accordance with claim 9, wherein the frame comprises a supply port carrier, which accommodates at least one supply port of the total set of supply ports, wherein the at least one supply port accommodated by the supply port carrier belongs to the total set of supply ports, but not to the remaining set of supply ports, and wherein with the at least one second detachably mountable wall panel fastened to the frame, the at least one second detachably mountable wall panel hides a respective area, which adjoins the supply port carrier, and leaves free the at least one supply port accommodated by the supply port carrier.

12. A patient medical care system for providing medical care of a patient, the system comprising:

a total set of supply ports, each of the supply ports of the total set of supply ports being configured to provide a supply medium for supplying a medical device, wherein the total set of the supply ports is configured as an intensive care supply port configuration to supply medical devices for intensive care of the patient, with supply media;

a frame;

a detachably mountable wall panel removably attached to the frame;

a wall panel fastening unit configured to detachably hold the detachably mountable wall panel at the frame such that movement of the detachably mountable wall panel in relation to the frame is prevented and such that with the detachably mountable wall panel detached from the frame the detachably mountable wall panel is freely movable in relation to the frame, wherein with the detachably mountable wall panel fastened to the frame at least one supply port of the total set of supply ports is hidden by the detachably mountable wall panel and a remaining set of supply ports of the total set of supply ports remains exposed, and wherein the remaining set of supply ports is configured as a normal care supply port configuration to supply medical devices for normal, non-intensive care of the patient, with supply media.

13. The system in accordance with claim 12, wherein the frame comprises a supply port carrier which accommodates a supply port of the total set of supply ports which belongs to the total set of supply ports, but not to the remaining set of supply ports, and the second detachably mountable wall panel is configured to be detachably fastened to the frame to:

hide an area and leaves exposed said supply port of the total set of supply ports which belongs to the total set of supply ports, but not to the remaining set of supply ports; or hide the supply port carrier and to hide said supply port of the total set of supply ports which belongs to the total set of supply ports, but not to the remaining set of supply ports.

14. The system in accordance with claim 12, further comprising another detachably mountable wall panel, wherein with both of the detachably mountable wall panels mounted at the frame, at least two supply ports of the total set of supply ports are hidden, and the remaining set of supply ports, comprising at least two supply ports of the total set of supply ports, remains exposed.

15. The system in accordance with claim 12, further comprising a wall panel supply port; and a coupling unit configured to detachably connect a device to the wall panel supply port, wherein the wall panel supply port is provided in a respective wall panel and is connectable to the coupling unit.

16. The system in accordance with claim 12, further comprising a manipulating unit configured to detachably connect to the detachably mountable wall panel and to support the detachably mountable wall panel connected thereto.

17. The system in accordance with claim 12, wherein:

the detachably mountable wall panel is a first detachably mountable wall panel;

the system further comprises a second detachably mountable wall panel;

the frame provides a chamber configured to accommodate the second detachably mountable wall panel; and the first detachably mountable wall panel is configured to be detachably fastened to the frame to close off the chamber with the second detachably mountable wall panel accommodated in the chamber.

18. The system in accordance with claim 17, wherein with the second detachably mountable wall panel fastened to the frame, the second detachably mountable wall panel hides at least one supply port which belongs to the total set of supply ports but that does not belong to the remaining set of supply ports.

19. The system in accordance with claim 12, further comprising:

a detachably mountable intensive care wall panel;

a holding device; and a holding device fastening unit, wherein:

the detachably mountable wall panel is a detachably mountable normal care wall panel;

the holding device is configured to hold a medical device for intensive care;

the holding device fastening unit is fastened to the frame and is configured to detachably fasten the holding device to the frame;

at least one opening is provided in the detachably mountable intensive care wall panel;

with the holding device and the intensive care detachably mountable wall panel detachably fastened to the frame, a portion of the holding device passed through the opening detachably connects to the holding device fastening unit; and with detachably mountable normal care wall panel fastened to the frame, the detachably mountable normal care wall panel hides the holding device fastening unit.

20. The system in accordance with claim 19, wherein the frame provides at least one chamber configured to accommodate the holding device detached from the frame;

the holding device fastening unit is located in an interior of the chamber; and with detachably mountable normal care wall panel fastened to the frame, the detachably mountable normal care wall panel hides the chamber with the holding device fastening unit.

* * * * *